(12) United States Patent
Kawaguchi

(10) Patent No.: US 8,965,856 B2
(45) Date of Patent: Feb. 24, 2015

(54) INCREASE IN DEDUPLICATION EFFICIENCY FOR HIERARCHICAL STORAGE SYSTEM

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 134 days.

(21) Appl. No.: 13/219,882

(22) Filed: Aug. 29, 2011

(65) Prior Publication Data

US 2013/0054894 A1    Feb. 28, 2013

(51) Int. Cl.
*G06F 17/30* (2006.01)
*G06F 3/06* (2006.01)

(52) U.S. Cl.
CPC .......... *G06F 17/3015* (2013.01); *G06F 3/0608* (2013.01); *G06F 3/0641* (2013.01); *G06F 3/067* (2013.01); *G06F 3/0689* (2013.01)
USPC ........................................................ 707/693

(58) Field of Classification Search
CPC ...... G06F 3/0641; G06F 3/067; G06F 3/0689
USPC ........................................................ 707/693
See application file for complete search history.

(56) References Cited

U.S. PATENT DOCUMENTS

| | | | |
|---|---|---|---|
| 6,928,526 B1 | 8/2005 | Zhu et al. | |
| 7,711,896 B2 | 5/2010 | Yamamoto et al. | |
| 2007/0055713 A1 | 3/2007 | Nagai et al. | |
| 2007/0300034 A1* | 12/2007 | Aoyama | 711/170 |
| 2008/0098236 A1* | 4/2008 | Pandey et al. | 713/189 |
| 2008/0184001 A1* | 7/2008 | Stager | 711/167 |
| 2008/0244196 A1 | 10/2008 | Shitomi et al. | |
| 2009/0013141 A1* | 1/2009 | Kinoshita | 711/163 |
| 2010/0070704 A1* | 3/2010 | Jibbe et al. | 711/114 |
| 2011/0040951 A1* | 2/2011 | Akirav et al. | 712/4 |
| 2011/0225130 A1* | 9/2011 | Tokoro | 707/692 |
| 2011/0258404 A1 | 10/2011 | Arakawa et al. | |

\* cited by examiner

*Primary Examiner* — William Spieler

(74) *Attorney, Agent, or Firm* — Mattingly & Malur, PC

(57) ABSTRACT

Exemplary embodiments provide improvement of deduplication efficiency for hierarchical storage systems. In one embodiment, a storage system comprises a storage controller; and a plurality of first volumes and a plurality of external volumes which are configured to be mounted to external devices. The storage controller controls to store related data which are derived from one of the plurality of first volumes in a first external volume of the plurality of external volumes. In another embodiment, the storage controller receives object data from a server and allocates the object data to the plurality of pool volumes. The plurality of pool volumes include a plurality of external volumes which are configured to be mounted to external devices. The storage controller controls to store the object data to the plurality of pool volumes based on object allocation information received from a backup server.

10 Claims, 28 Drawing Sheets

| Volume # | Port#/LUN | Capacity | Pool # | Tier Policy |
|---|---|---|---|---|
| 0 | 0/0, 8/0 | 1000GB | 0 | 0,1 |
| 1 | 0/1, 8/1 | 1000GB | 0 | 0,1,2 |
| 2 | 0/2, 8/2 | 1000GB | 0 | 0,1,2 |
| 3 | 0/3, 8/3 | 1000GB | 0 | 0,1,2 |
| 4 | 1/0 | 1000GB | 0 | 2 |
| 5 | 1/1 | 1000GB | 0 | 2 |
| 6 | 1/2 | 1000GB | 0 | 2 |
| 7 | 1/3 | 1000GB | 0 | 2 |
| 8 | 3/0, 11/0 | 2000GB | 1 | 0,1 |
| 9 | 3/1, 11/1 | 2000GB | 1 | 0,1 |
| 10 | 3/2, 11/2 | 2000GB | 1 | 0,1 |

Volume Management Table

RAID Gr. Management Table

| 102-11-1 | 102-11-2 | 102-11-3 | 102-11-4 | 102-11-5 | 102-11-5 |
|---|---|---|---|---|---|
| RAID Gr.# | Disk Type | Deduplication Function | Capacity | RAID Lv. | Device |
| 0 | SAS | No | 400GB | 10(2D+2D) | 0,1,2,3 |
| 1 | SAS | No | 400GB | 10(2D+2D) | 4,5,6,7 |
| 2 | SATA | No | 6000GB | 5(3D+1P) | 32,33,34,35 |
| 3 | SATA | No | 6000GB | 5(3D+1P) | 36,37,38,39 |
| 4 | External | No | 3000GB | External | 12:23:45:67:8 9:AB:CD:00/0 |
| 5 | External | No | 3000GB | External | 12:23:45:67:8 9:AB:CD:00/1 |
| 6 | External | No | 3000GB | External | 12:23:45:67:8 9:AB:CD:00/2 |
| 7 | External | Yes | 100000GB | External | 11:22:33:44:5 5:66:77:00/0 |
| 8 | External | Yes | 100000GB | External | 11:22:33:44:5 5:66:77:01/0 |
| 9 | External | Yes | 100000GB | External | 11:22:33:44:5 5:66:77:02/0 |
| 10 | External | Yes | 100000GB | External | 11:22:33:44:5 5:66:77:03/0 |
| 11 | SSD | No | 700GB | 5(7D+1P) | 80,81,82,83,84 ,85,86,87 |
| 12 | SSD | No | 700GB | 5(7D+1P) | 88,89,90,91,92 ,93,94,95 |

| RAID Gr.# | Tier# | Used Page# | Unused Page# |
|---|---|---|---|
| 0 | 1 | 0-557 | 558-3999 |
| 1 | 1 | 0-168, 200-676 | 169-199, 677-3999 |
| 7 | 2 | 0-346 | 347-999999 |
| 8 | 2 | 0-1290 | 1291-999999 |
| 9 | 2 | 0-956 | 957-999999 |
| 10 | 2 | 0-735 | 736-999999 |
| 11 | 0 | 0-6591 | 6592-6999 |
| 12 | 0 | 0-6277 | 6278-6999 |

102-13-1-1  102-13-1-2  102-13-1-3  102-13-1-4

Pool Management Table

FIG. 10

| Volume # | Virtual Volume Page # | I/O Frequency | RAID Gr. # | Capacity Pool Page # |
|---|---|---|---|---|
| 0 | 0 | 34936 | 11 | 10 |
| | 1 | 55476 | 12 | 86 |
| | 2 | 3 | 8 | 23 |
| | 3 | 0 | 9 | 785 |
| | 4 | 456 | 0 | 366 |
| | 5 | 833 | 1 | 545 |
| | 6 | 848 | 0 | 473 |
| | 7 | 343 | 1 | 13 |
| | 8 | 5 | 8 | 65 |
| | 9 | 8 | 10 | 95 |
| | 10 | 3 | 11 | 19 |

Page Management Table

| Pair ID 102-14-1-1 | Primary Volume# 102-14-1-2 | Secondary Volume# 102-14-1-3 | Pair Status 102-14-1-4 |
|---|---|---|---|
| 0 | 11 | 23 | COPY |
| 1 | 11 | 24 | PSUS |
| 2 | 1 | 4 | PSUS |
| 3 | 1 | 5 | PSUS |
| 4 | 1 | 6 | PSUS |
| 5 | 44 | 45 | PAIR |
| 6 | 46 | 47 | PAIR |
| 7 | 48 | 49 | COPY |
| 8 | 50 | 51 | PAIR |

Pair Management Table 102-14-1

FIG. 11

| Page# 402-13-1 | Data Hash 402-13-2 | Modified 402-13-3 | Data Area# 402-13-4 |
|---|---|---|---|
| 0 | 0x2350AE55 | Yes | 0 |
| 1 | 0x98BF2432 | No | 1 |
| 2 | 0x11908378 | No | 2 |
| 3 | 0x9DD2A068 | No | 3 |
| 4 | 0x5197B74E | No | 4 |
| 5 | 0xB0CD6D59 | No | 5 |
| 6 | 0x90E7A8DE | No | 6 |
| 7 | 0x5197B74E | No | 4 |
| 8 | 0x1F7656CD | Yes | 7 |
| 9 | 0x98BF2432 | No | 1 |
| 10 | 0x8260F33C | No | 8 |

Deduplication Management Table 402-13

FIG. 15

| 102-13-2-1 | 102-13-2-2 | 102-13-2-3 | 102-13-2-6 | 102-13-2-7 | 102-13-2-4 | 102-13-2-5 |
|---|---|---|---|---|---|---|
| Volume# | Virtual Volume Page# | I/O Frequency | Modified | Hash Value | RAID Gr.# | Capacity Pool Page# |
| 0 | 0 | 34936 | No | 0xE1D3F54D | 11 | 10 |
|   | 1 | 55476 | No | 0xFC63EF9B | 12 | 86 |
|   | 2 | 3 | No | 0x557CB1F5 | 8 | 23 |
|   | 3 | 0 | No | 0xC4D205CF | 9 | 785 |
|   | 4 | 456 | Yes | 0xFB7C3641 | 0 | 366 |
|   | 5 | 833 | No | 0xC4D205CF | 9 | 785 |
|   | 6 | 848 | No | 0x36984D8E | 0 | 473 |
|   | 7 | 343 | No | 0xEC18A7AF | 1 | 13 |
|   | 8 | 5 | No | 0x36984D8E | 8 | 65 |
|   | 9 | 8 | No | 0x557CB1F5 | 8 | 23 |
|   | 10 | 3 | No | 0xEC18A7AF | 1 | 13 |

| Object# | Object Classification# | Volume# | Top Address | Size |
|---|---|---|---|---|
| 601-1 | 601-2 | 601-3 | 601-4 | 601-5 |
| 0 | 0 | 0 | 0x00000000 | 234MB |
| 1 | 1 | 0 | 0x36C679AD | 160MB |
| 2 | 0 | 1 | 0xEF97779E | 234MB |
| 3 | 0 | 2 | 0x61ACC7B9 | 234MB |
| 4 | 2 | 0 | 0x7799B01F | 538MB |
| 5 | 2 | 1 | 0x46A6C103 | 538MB |
| 6 | 2 | 2 | 0xE1EEBE63 | 538MB |
| 7 | 3 | 0 | 0xDA5E6916 | 54MB |
| 8 | 4 | 0 | 0xA64FAA43 | 68MB |
| 9 | 5 | 0 | 0x85F2249C | 939MB |
| 10 | 5 | 1 | 0x2638B2B8 | 939MB |

Data Address List

FIG. 26

INCREASE IN DEDUPLICATION EFFICIENCY FOR HIERARCHICAL STORAGE SYSTEM

BACKGROUND OF THE INVENTION

The present invention relates generally to storage systems and, more particularly, to improvement of deduplication efficiency for hierarchical storage systems.

Recently, deduplication technology has become very popular. The technology involves two control methods. The first method is to find same data. The second method is to share the found same data between two objects ("object" includes "file", "region" and so on). Each method is described, for example, in U.S. Pat. No. 6,928,526 on control method of deduplication using hash table and page management. The first method uses a hash table. The hash value in the hash table is generated from stored data. The second method uses page (segment) management. If two objects have the same data, the pages in the two objects refer to the same stored data.

In general, the number of pages increases with increased storage capacity. The table capacity for the pages also increases with an increase in the number of pages. When the storage has many pages and a large table capacity, the storage performance will drop because of complex table structure or the storage price will run up because of rich hardware configuration. For example, if the hash data is 128 bits per 4 KB stored data, 1PB storage requires 4 TB hash table.

To resolve that issue, the configuration described in US 2008/0244196 on storage functions with standardized storage interface is useful. A storage device can mount one or more VTLs (Virtual Tape Libraries) using a technology described in U.S. Pat. No. 7,711,896 on control method of external volume function, if the VTL supports block storage interface. Strictly speaking, the use of the term "VTL" is not correct in this sentence because "VTL" means that the storage has tape interface and deduplication function. By this configuration, the storage can have deduplication function without deduplication management table (including hash table) in itself. The storage device can offload controls and management of deduplication function to external VTLs. However, in this configuration, it is difficult to deduplicate if the same data is stored into two VTLs, because the storage device and each VTL do not know that the same data is stored in the other VTL.

BRIEF SUMMARY OF THE INVENTION

Exemplary embodiments of the invention provide improvement of deduplication efficiency for hierarchical storage systems. A system includes a server, a storage device, and VTLs. Each VTL has deduplication function. The storage device connects the VTLs to store data. The server, the storage device, or the VTL knows the alignment and the relation of data objects. The storage device or the VTL controls the location of the stored data based on the alignment and the relation information.

According to a first embodiment, a storage device has external volumes which connect to the VTLs. The storage device knows the relation between volumes such as a local copy pair. If two volumes are backup of one same volume, those backup volumes may have similar data. As such, the storage device stores data in the same address of each backup volume into the same VTL. In this way, the probability for data to be deduplicated can be raised.

According to a second embodiment, a storage device has external volumes which connect to the VTLs. The VTL mounts a volume provided by the storage device to store data (or deduplicated data). The storage device has deduplication function and the volumes in the storage device have larger page size than the volumes in the VTL. The storage device deduplicates data of the VTLs using its deduplication function. The VTLs sort the stored deduplicated data to make the storage device easier to deduplicate.

According to a third embodiment, a backup server knows the location and relation of each backup data stored in the storage device. The backup server provides the location and relation information to the storage device. The storage device selects a VTL to store page data based on the location and relation information.

In accordance with an aspect of the present invention, a storage system comprises a storage controller including a processor and a memory; and a plurality of first volumes and a plurality of external volumes which are configured to be mounted to external devices. The storage controller controls to store related data which are derived from one of the plurality of first volumes in a first external volume of the plurality of external volumes.

In some embodiments, a plurality of first volumes are allocated from a pool and the pool includes the plurality of external volumes. The storage controller controls to store the related data in the first external volume that is mounted from a first external storage system so that the related data which are derived from the one first volume of the plurality of first volumes are deduplicated by the first external storage system. The storage controller controls to store related data which are derived from another one of the plurality of first volumes in a second external volume of the plurality of external volumes. The second external volume is mounted from a second external storage system so that the related data which are derived from said another one first volume of the plurality of first volumes are deduplicated by the second external storage system. The related data which are derived from the one first volume of the plurality of first volumes are snapshots of the one first volume. The related data which are derived from the one first volume of the plurality of first volumes include backup of the one first volume.

In accordance with another aspect of the invention, a system comprises a plurality of nodes each having a node processor or and a node memory, and a storage system having a storage controller which includes a processor and a memory. A first node of the plurality of nodes receives hash values each calculated by other nodes of the plurality of nodes, and determines data alignment based on the calculated hash values from the other nodes. The storage controller performs deduplication of data received from the other nodes, which are aligned by the first node according to the determined data alignment.

In some embodiments, a data size of deduplication performed by the other nodes of the plurality of nodes is smaller than a data size of deduplication performed by the storage controller. The first node is a meta data server which includes meta data and locations of files stored in the plurality of nodes. The first node sorts the hash values and, for data having the same hash values, migrates deduplication pool pages in the nodes having the same hash values to a same virtual volume page in the storage system. The storage system includes a plurality of pool volumes and a plurality of volumes allocated from the plurality of pool volumes. The plurality of pool volumes in the storage system include a plurality of external volumes which are mounted to volumes in the plurality of nodes. The plurality of volumes in the storage system include volumes that are mounted by the nodes.

In accordance with another aspect of this invention, a storage system comprises a storage controller including a processor and a memory, and a plurality of pool volumes. The storage controller receives object data from a server and allocates the object data to the plurality of pool volumes. The plurality of pool volumes include a plurality of external volumes which are configured to be mounted to external devices. The storage controller controls to store the object data to the plurality of pool volumes based on object allocation information received from a backup server.

In some embodiments, a first pool volume of the plurality of pool volumes is mounted from a first external storage system so that the object data allocated to the first pool volume are deduplicated by the first external storage system. The object allocation information comprises object classification and alignment information derived from location and relation information of each backup data in the storage system. Based on the object classification and alignment information, the storage controller selects same classification objects from the object data, finds same capacity pool pages of the selected same classification objects, selects capacity pool pages in one of the external volumes of the plurality of pool volumes, and migrates the found same capacity pool pages of the selected same classification objects to the selected capacity pool pages in the one external volume.

These and other features and advantages of the present invention will become apparent to those of ordinary skill in the art in view of the following detailed description of the specific embodiments.

BRIEF DESCRIPTION OF THE DRAWINGS

FIG. 7 illustrates an example of the configuration of a Volume Management Table.

FIG. 8 illustrates an example of the configuration of a RAID Group Management Table.

FIG. 9 illustrates an example of the configuration of a Pool Management Table.

FIG. 10 illustrates an example of the configuration of a Page Management Table according to the first embodiment.

FIG. 11 illustrates an example of the configuration of a Pair Management Table.

FIG. 15 illustrates an example of the configuration of the Deduplication Management Table.

FIG. 21 illustrates an example of configuration of Pool Management Table according to the second embodiment.

FIG. 26 illustrates an example of the configuration of the Data Address List of the backup server according to the third embodiment.

DETAILED DESCRIPTION OF THE INVENTION

Figure 1:
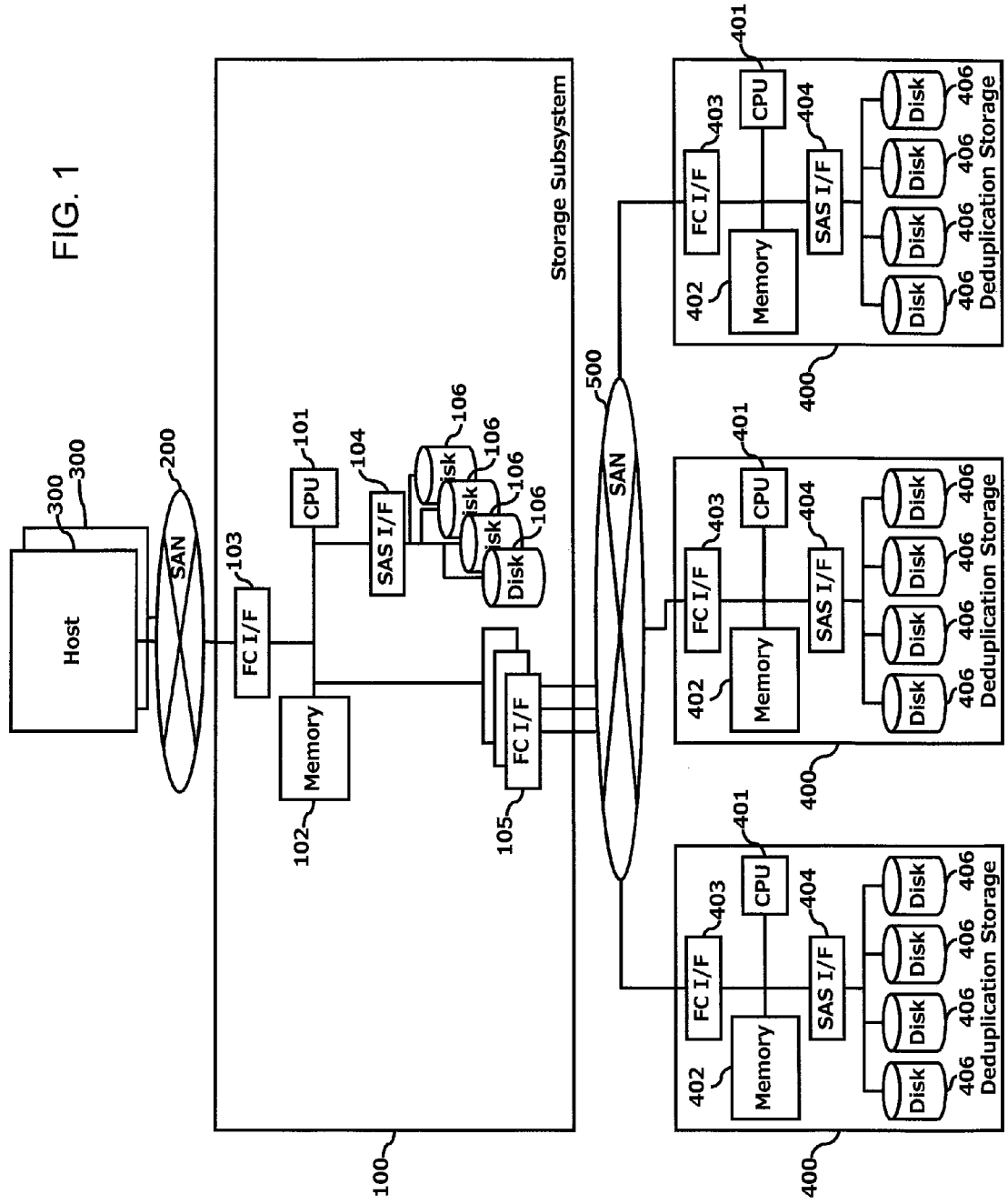
FIG. 1 illustrates an example of a hardware configuration of an information system in which the method and apparatus of the invention may be applied according to the first embodiment.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for improvement of deduplication efficiency for hierarchical storage systems. In the environment which has a storage subsystem and plural deduplication storage devices connected to the storage subsystem, the same data may be stored to different deduplication storage devices. It causes a decrease of deduplication efficiency. In the present invention, the storage subsystem or deduplication storage devices know or ask for the alignment and classification of data objects, so that these devices know the characteristics of the deduplication function and can adjust the storage destination to store the data. In this way, it can increase the storage efficiency without substantial calculation.

First Embodiment

In the first embodiment, a storage device has some local copy pairs which share the same primary volumes. The storage device stores the same address regions in the secondary volumes paired with the shared primary volumes into the same deduplication storage device.

FIG. 1 illustrates an example of a hardware configuration of an information system in which the method and apparatus of the invention may be applied according to the first embodiment. A network 200 connects host computers 300 and a storage subsystem 100. Another network 500 connects the storage subsystem 100 and deduplication storage devices 400. The storage subsystem 100 has a CPU 101 that controls the storage subsystem 100 and runs programs and uses tables stored in a memory 102. The memory 102 stores programs and tables. A channel interface 103 is provided for interfacing with the network 200. The storage subsystem 100 has disk interfaces 104 to connect to disks 106. The storage subsystem 100 has channel interfaces 105 to interface with the deduplication storage devices 400. Each deduplication storage device 400 has a CPU 401 that controls the deduplication storage device 400 and runs programs and uses tables stored in a memory 402. The memory 402 stores programs and tables. A channel interface 403 is provided for interfacing with the network 500. The deduplication storage device 400 has disk interfaces 404 to connect to disks 406.

Figure 2:
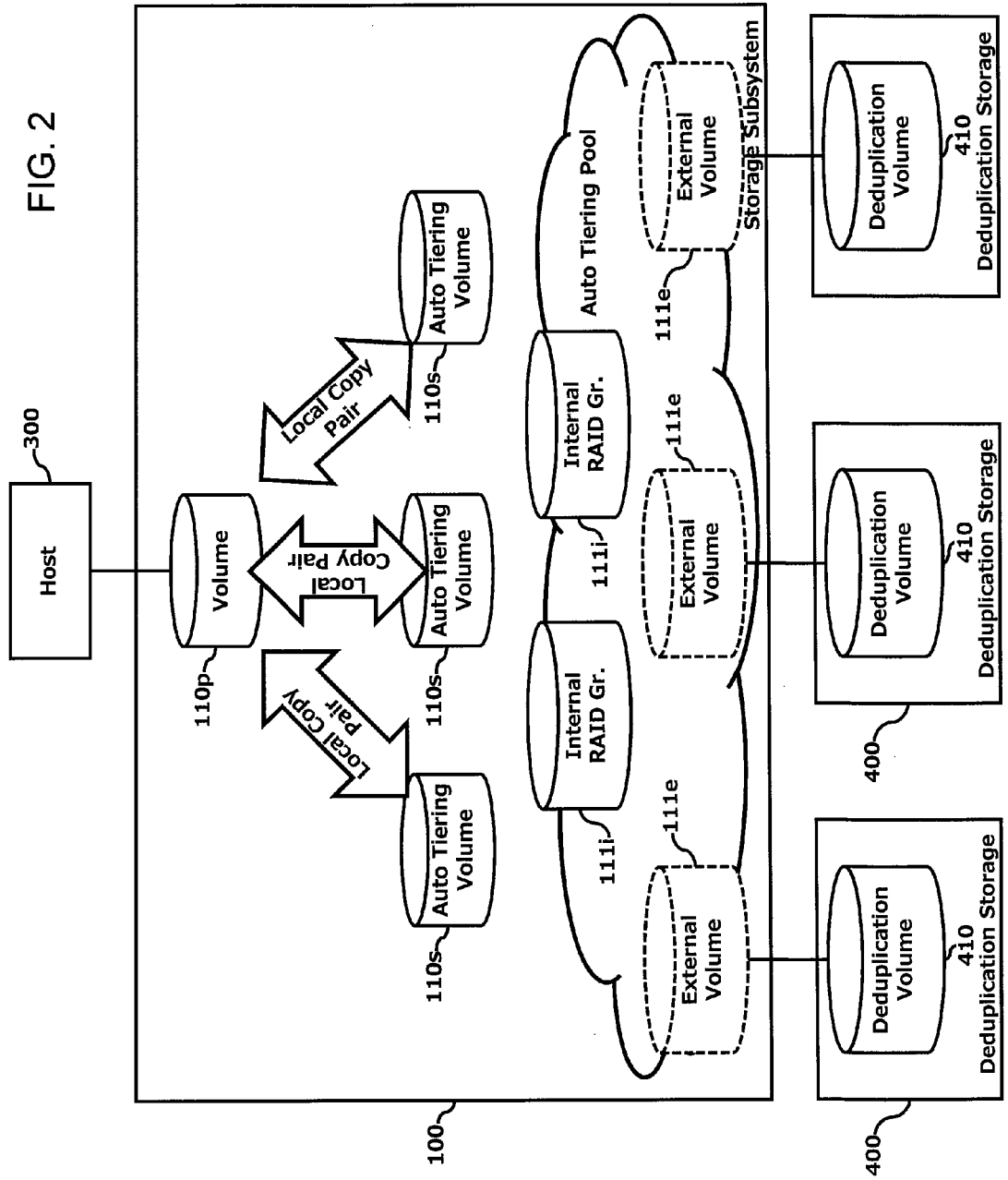
FIG. 2 illustrates an example of a logical configuration of the invention applied to the architecture of FIG. 1 according to the first embodiment.

FIG. 2 illustrates an example of a logical configuration of the invention applied to the architecture of FIG. 1 according to the first embodiment. The storage subsystem 100 provides plural volumes 110. The volumes 110 are classified into a primary volume 110*p* and secondary volumes 110*s*. One primary volume 110*p* and one secondary volume 110*s* make up one local copy pair. The storage subsystem 100 can take snapshot of the primary volume 110*p* into the secondary volume 110*s*. One primary volume 110*p* is shared by plural secondary volumes 110*s* to make up plural local copy pairs. The primary volume 110*p* is provided and connected to a host computer 300. The storage subsystem 100 provides internal RAID groups 111*i* and external volumes 111*e*. The internal RAID groups 111*i* and external volumes 111*e* are collectively referred to as pool volumes 111. Each internal RAID group 111*i* has disks 106. Each external volume 111*e* mounts a volume 410 (as deduplication volume) provided from a deduplication storage device 400. The storage subsystem 100 stores data of a volume 110 into pool volumes 111, and the storage subsystem 100 migrates the stored data among them. The storage subsystem 100 provides an auto tiering pool which consists of the pool volumes 111. The deduplication storage device 400 provides a deduplication volume 410 which is mounted by the storage subsystem 100.

Figure 3:
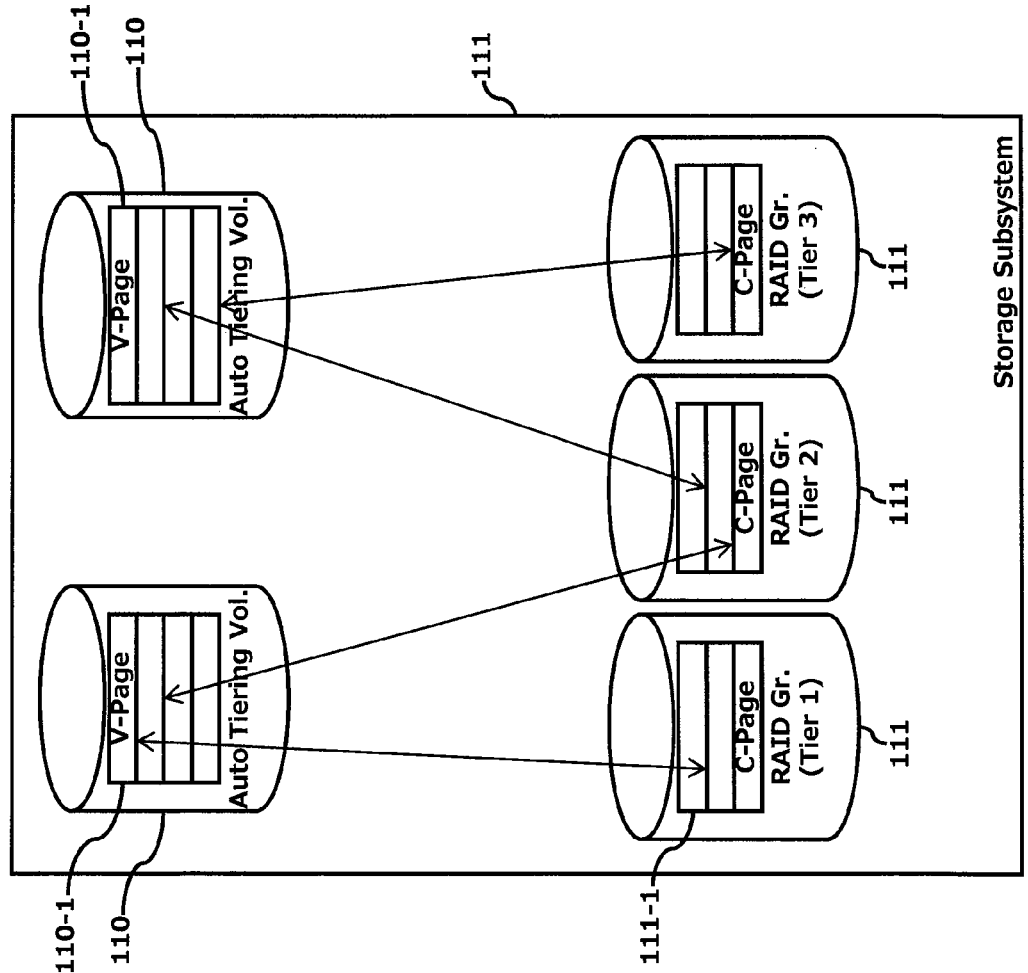
FIG. 3 illustrates an example of the logical configuration of volumes and pool volumes.

FIG. 3 illustrates an example of the logical configuration of volumes 110 and pool volumes 111. A volume 110 is split into plural virtual volume pages 110-1. A pool volume 100 is split into plural capacity pool pages 111-1. The storage subsystem 100 manages the relation between a virtual volume page 110-1 and a capacity pool page 111-1. When data is written into a volume 110, the data is stored into a pool volume 111. The stored region is determined by the relation between the virtual volume page 110-1 and capacity pool page 111-1.

Figure 4:
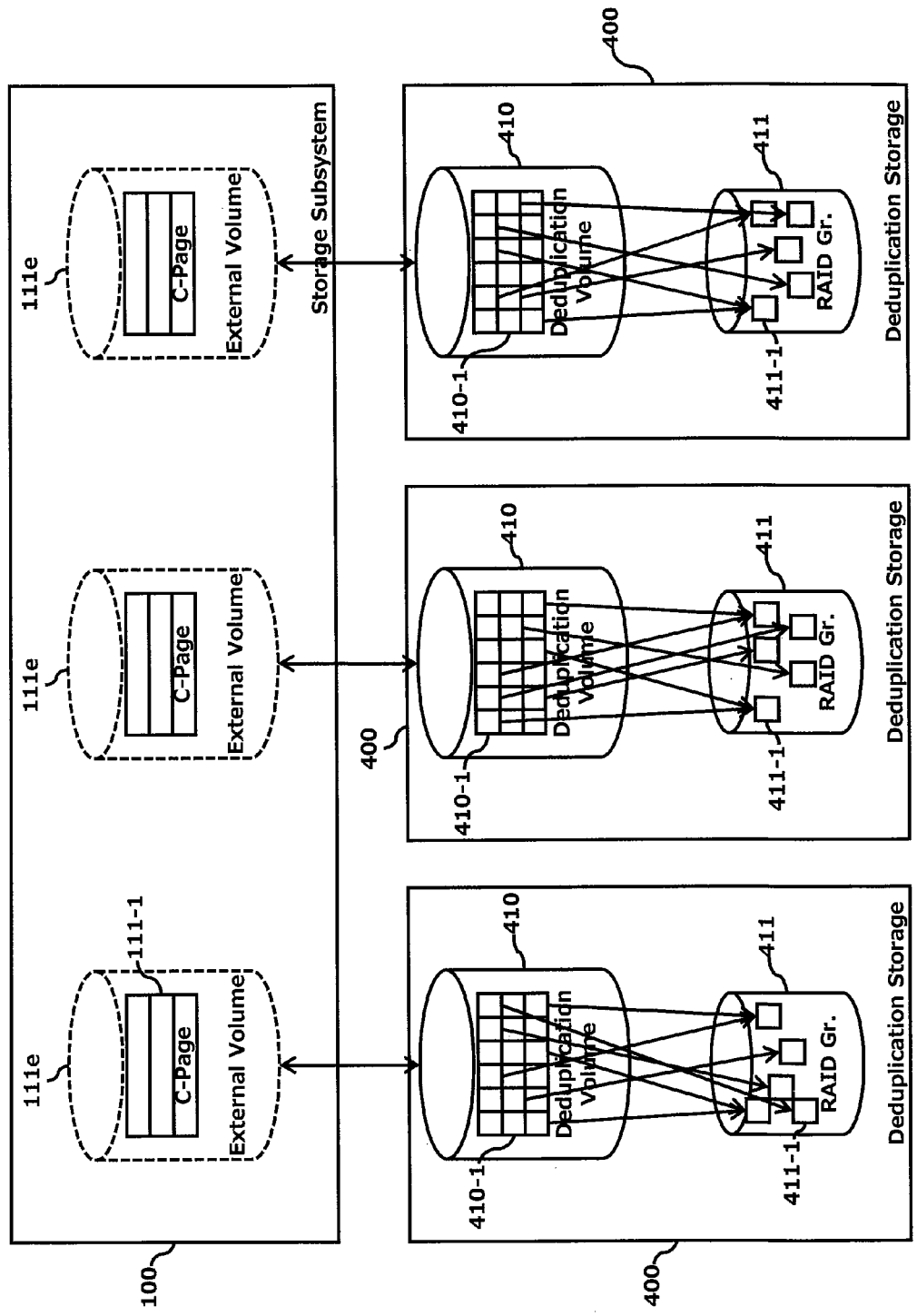
FIG. 4 illustrates an example of the logical configuration of a deduplication storage device according to the first embodiment.

FIG. 4 illustrates an example of the logical configuration of a deduplication storage device 400 according to the first embodiment. The deduplication storage 400 provides the volume 410 mounted by the storage subsystem 100. The deduplication storage 400 provides a deduplication pool 411 to store data written into the volume 410. The deduplication pool consists of the disks 406. A volume 410 is split into plural deduplication volume pages 410-1. A deduplication pool 411 is split into plural deduplication pool pages 411-1. In general, the size of a deduplication volume page 410-1 and the size of a deduplication pool page 411-1 are smaller than the size of a virtual volume page 110-1 and the size of a capacity pool page 111-1, respectively. For example, the former may be 4 KB and the latter may be 42 MB. The deduplication storage device 400 manages the relation between the deduplication volume pages 410-1 and a deduplication pool page 411-1. Plural deduplication volume pages 410-1 can refer to one deduplication pool page 411-1.

Figure 5:
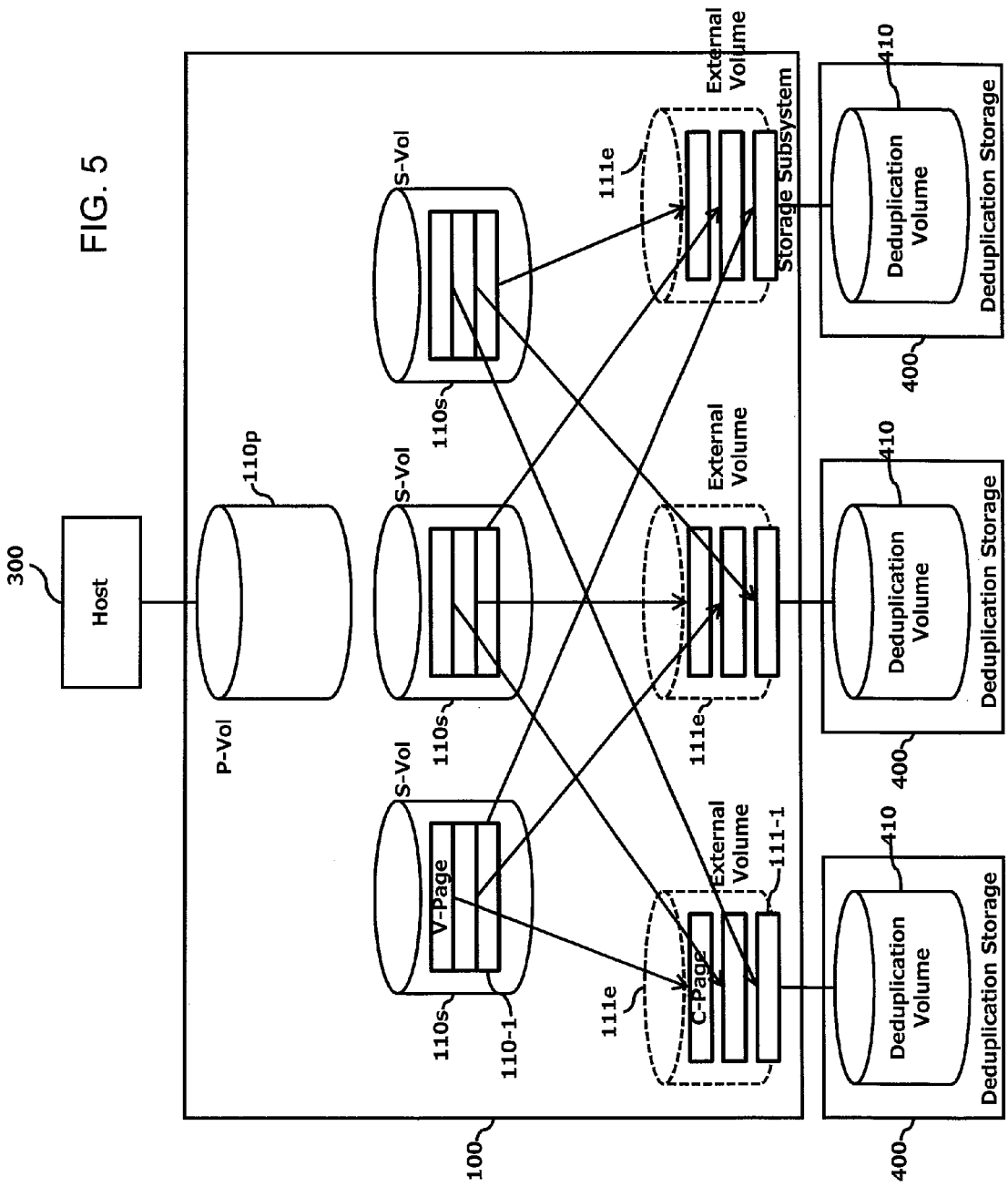
FIG. 5 illustrates the concept and expected result of the first embodiment.

FIG. 5 illustrates the concept and expected result of the first embodiment. There are secondary volumes 110s which share one primary volume 110p in the storage subsystem 100. In this case, the secondary volumes 110s will have similar data. The data stored in same address region of the secondary volumes 110s are stored into the same external volume 111e. In this way, one can expect the same data to be stored into the same deduplication storage device 400. To establish such a configuration, the storage subsystem 100 allocates capacity pool pages 111-1 from one external volume 111e for virtual volume pages 110-1 of the same address of the secondary volumes 110s.

Figure 6:
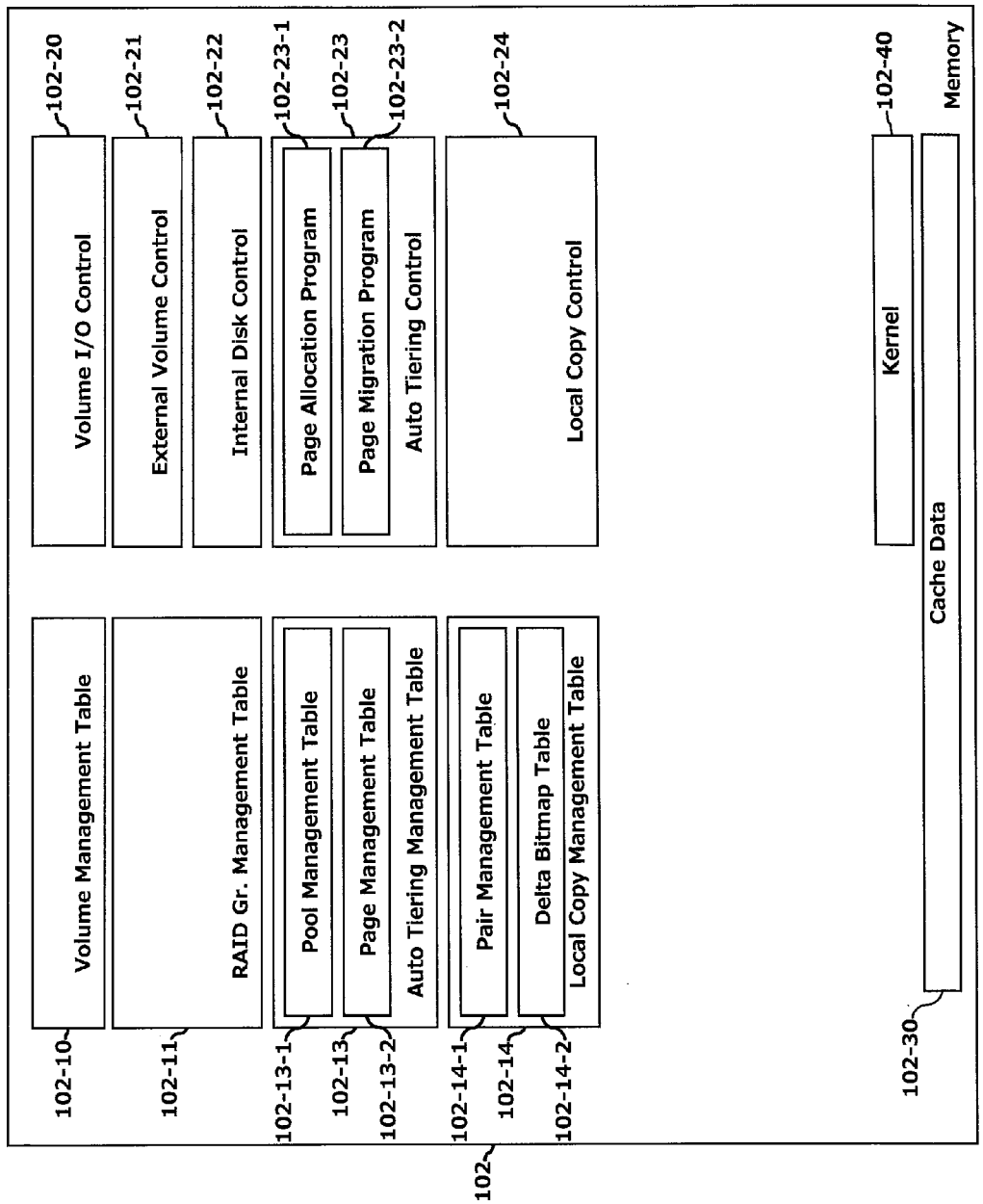
FIG. 6 illustrates an example of the configuration of tables and programs in the memory of the storage subsystem of FIG. 1 according to the first embodiment.

FIG. 6 illustrates an example of the configuration of tables and programs in the memory 102 of the storage subsystem 100 of FIG. 1 according to the first embodiment. A Volume Management Table 102-10 manages the configuration of the volumes 110 (see FIG. 7). A RAID Group Management Table 102-11 manages the configuration of the pool volumes 111 which includes internal RAID groups 111i and external volumes 111e (see FIG. 8). An Auto Tiering Management Table 102-13 includes a Pool Management Table 102-13-1 and a Page Management Table 102-13-2. The Pool Management Table 102-13-1 manages the configuration of a pool (see FIG. 9). The Page Management Table 102-13-2 manages the relations of virtual volume pages 110-1 and capacity pool pages 111-1 (see FIG. 10). A Local Copy Management Table 102-14 includes a Pair Management Table 102-14-1 and a Delta Bitmap Table 102-14-2. The Pair Management Table 102-14-1 manages local copy pairs and volumes establishing the local copy pair (see FIG. 11). The Delta Bitmap Management Table 102-14-2 manages the area that has different data between a primary volume 100p and a secondary volume 100s which establish a local copy pair. This technology is generally known and is not described in detail here.

A Volume I/O Control 102-20 controls read and write I/O to a volume 110. This technology is generally known and is not described in detail here. An External Volume Control 102-21 controls read and write I/O to an external volume 111e. Details of this technology are described, for instance, in U.S. Pat. No. 7,711,896. An Internal Disk Control 102-22 controls read and write I/O to disks the 106 and redundancy (mirroring and parity calculation) control. This technology is generally known and is not described in detail here. An Auto Tiering Control 102-23 includes a Page Allocation Program 102-23-1 and Page Migration Program 102-23-2. The Page Allocation Program 102-23-1 selects and allocates a capacity pool page 111-1 to a virtual volume page 110-1 when write I/O or cache destaging occurs (see FIG. 12). The Page Migration Program 102-23-2 migrates data and allocation between two capacity pool pages 111-1 (see FIG. 13). A Local Copy Control 102-24 copies data between a primary volume and a secondary volume which establish a local copy pair. This technology is generally known and is not described in detail here.

FIG. 7 illustrates an example of the configuration of a Volume Management Table 102-10. This table includes the following columns. Volume Number 102-10-1 represents the ID of the volume 110. LU information 102-10-2 represents the reachable channel interface (channel interface 105) number and LU (logical unit) number. Volume Capacity 102-10-3 represents the capacity of the virtual volume. Pool Number 102-10-4 represents the pool ID of the pool to which that volume stores data. Tier Policy Information 102-10-5 represents the tier ID of the tier from which that volume allocates a capacity pool page 111-1.

FIG. 8 illustrates an example of the configuration of a RAID Group Management Table 102-11. This table includes the following columns. RAID Group Number 102-11-1 represents the ID of RAID Group (pool volume 111). In this table, an external volume 111e is dealt with as a RAID Group. Disk Type Information 102-11-2 represents the disk type. If the RAID group is an external volume, "External" is stored in the cell. Deduplication Information 102-11-3 represents the presence and absence of deduplication function in the RAID group. If the RAID group is not an external volume, the cell entry is "No." If the RAID group is an external volume and does not support a deduplication function, the cell entry is "No." If the RAID group is an external volume and supports a deduplication function, the cell entry is "Yes." RAID Group Capacity 102-11-4 represents the capacity of the RAID group. RAID Level 102-11-5 represents the RAID level and RAID configuration. If the RAID group is an external volume, the cell entry is "External." Device Number 102-11-6 represents the device numbers contained in the RAID Group. If the RAID group is an internal RAID Group 111i, the cell stores the IDs of the disks 106 contained in the RAID group. If the RAID group is an external volume 111e, the cell stores the WWPN (World Wide Port Number) and LUN (Logical Unit Number) of the mounted volume.

FIG. 9 illustrates an example of the configuration of a Pool Management Table 102-13-1. This table includes the following columns. RAID Group Number 102-13-1-1 represents the ID of the pool volume 111 (internal RAID groups 111i and external volumes 111e). Tier Number 102-13-1-2 represents the tier number of the pool volume 111 in the pool. The number is determined by the type of disk or external volume. For example, an internal RAID group using SSD is set to tier 0. An internal RAID group using SAS is set to tier 1. An external volume having deduplication function is set to tier 2. Used Page Number 102-13-1-3 represents the ID of already-used capacity pool pages of the RAID group. Unused Page Number 102-13-1-4 represents the ID of free capacity pool pages of the RAID group. When a capacity pool page is allocated or migrated, the capacity pool page is selected from this list.

FIG. 10 illustrates an example of the configuration of a Page Management Table 102-13-2 according to the first embodiment. This table includes the following columns. Volume Number 102-13-2-1 represents the ID of a volume 110. Virtual Volume Page Number 102-13-2-2 represents the ID of a virtual volume page 110-1 of the volume. Access Information 102-13-2-3 represents the I/O frequency to optimize the tier. RAID Group Number 102-13-2-4 represents the ID of a pool volume 111 to which the virtual volume page refers.

Capacity Pool Page Number 102-13-2-5 represents the ID of a capacity pool page 111-1 to which the virtual volume page refers.

FIG. 11 illustrates an example of the configuration of a Pair Management Table 102-14-1. This table includes the following columns. Pair ID 102-14-1-1 represents the ID of the local copy pair. Primary Volume Number 102-14-1-2 represents the ID of a primary volume 110$p$. Secondary Volume Number 102-14-1-3 represents the ID of a secondary volume 110$s$. Pair Status 102-14-1-5 represents the pair status as "COPY," "PSUS," or "PAIR." When the pair status is "COPY", the storage subsystem copies whole data of the primary volume to the paired secondary volume. After initial copy is finished, the "COPY" status changes to "PAIR". When the pair status is "PAIR", the storage subsystem is able to take a snapshot of the primary volume to the paired secondary volume. When the storage subsystem takes the snapshot, the "PAIR" status changes to "PSUS".

Figure 12:
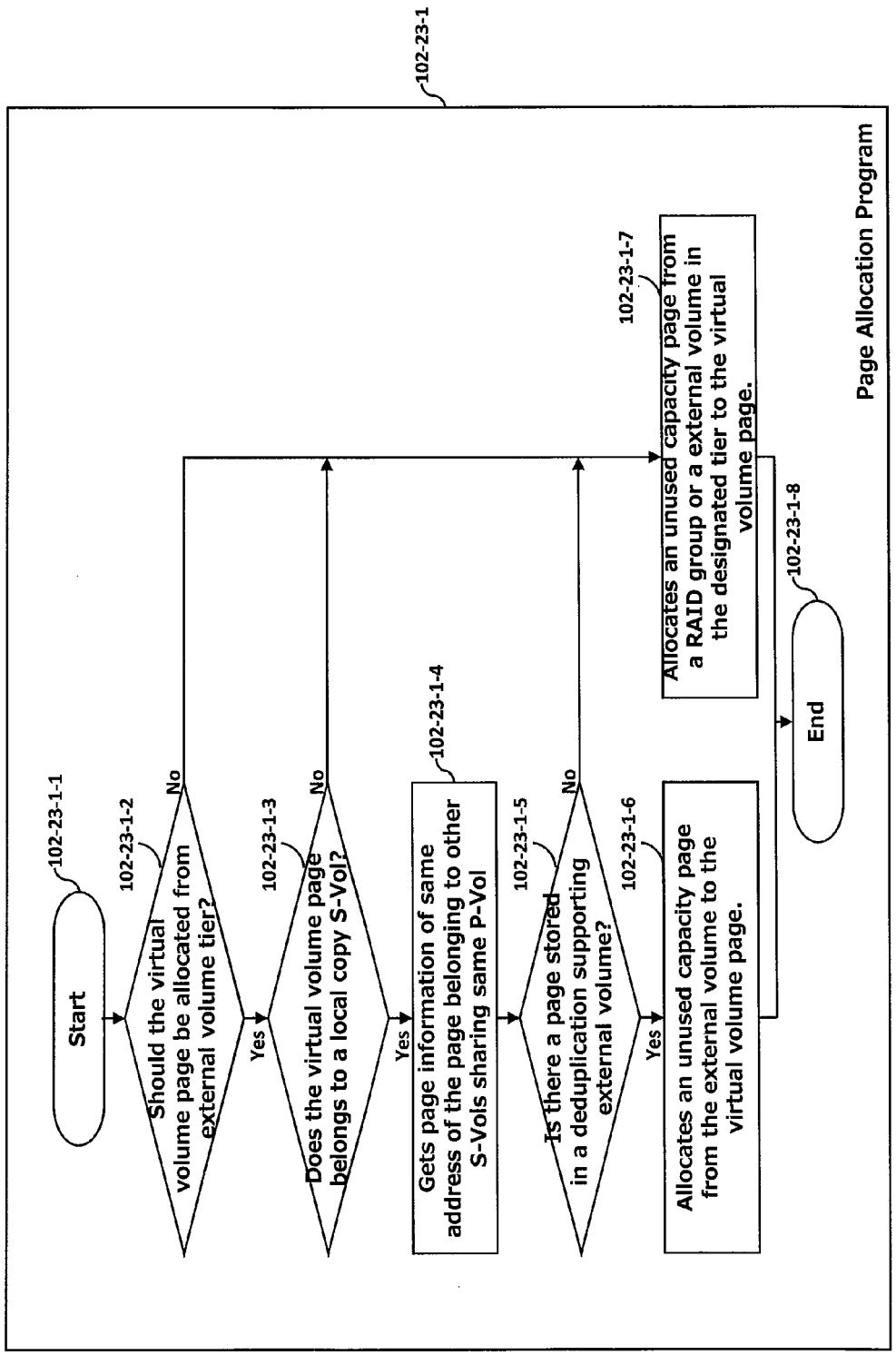
FIG. 12 illustrates an example of a process flow of the Page Allocation Program.

FIG. 12 illustrates an example of a process flow of the Page Allocation Program 102-23-1. This program is called by the Volume I/O Control 102-20, External Volume Control 102-21, or Internal Disk Control 102-22 after write I/O occurs to a volume 110 with a virtual volume page number to be allocated a capacity pool page. The program starts at step 102-23-1-1. In step 102-23-1-2, this program checks the condition under which the volume should be provisioned a capacity pool page from an external volume 110$e$. The information to judge is stored in the Tier Policy Information 102-10-5 (see FIG. 7). If a capacity pool page is allocated from an external volume 111$e$, the program proceeds to step 102-23-1-3. If a capacity pool page is not allocated from an external volume 111$e$, the program proceeds to step 102-23-1-7. In step 102-23-1-3, this program checks the attribution of the volumes by referring to the Pair Management Table 102-14-1 (see FIG. 11). If the volume is a secondary volume, the program proceeds to step 102-23-1-4. If the volume is not a secondary volume, the program proceeds to step 102-23-1-7. In step 102-23-1-4, this program gets a primary volume paired with this secondary volume and gets other secondary volumes paired with the primary volume by referring to the Pair Management Table 102-14-1. This program finds a capacity volume page for a virtual volume page of the other secondary volumes in same address with the designated address. Further, this program gets the external volume 111$e$ for which a capacity pool page linked to the virtual volume page of the other secondary volumes is stored.

In step 102-23-1-5, this program checks whether the external volume 111$e$ has deduplication function by referring to the Deduplication Information 102-11-3 (see FIG. 8). If the volume has deduplication function, this program proceeds to step 102-23-1-6. If the volume does not have deduplication function, this program proceeds to step 102-23-1-7. In step 102-23-1-6, this program allocates an unused capacity pool page to the designated virtual volume page from the external volume selected in step 102-23-1-4 by referring to the Pool Management Table 102-13-1 (see FIG. 9). In step 102-23-1-7, this program allocates an unused capacity pool page to the designated virtual volume page from an adequate pool volume by referring to the Pool Management Table 102-13-1. In step 102-23-1-8, this program ends.

Figure 13:
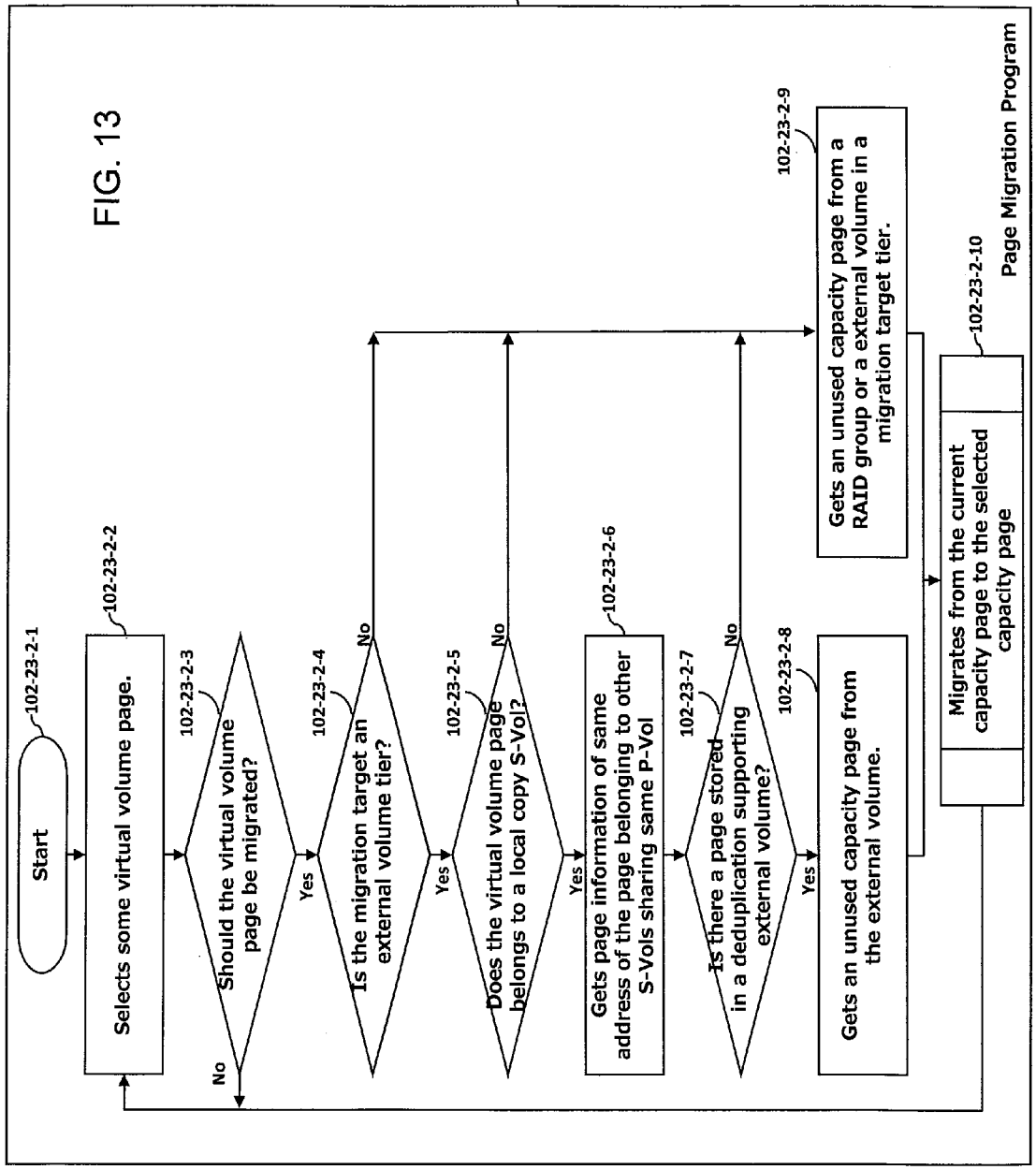
FIG. 13 illustrates an example of a process flow of the Page Migration Program.

FIG. 13 illustrates an example of a process flow of the Page Migration Program 102-23-2. This program is a resident program. The program starts at step 102-23-2-1. In step 102-23-2-2, this program selects an adequate virtual volume page. In step 102-23-2-3, this program checks whether the allocated capacity pool page linked to the virtual volume page should be migrated to some other pool volume 111 by referring to the Page Management Table 102-13-2 (see FIG. 10). If it should be migrated, this program selects a migration target tier and proceeds to step 102-23-2-4. If it does not need to be migrated, this program proceeds to step 102-23-2-2. In step 102-23-2-4, this program checks the attribution of the migration target tier. The information is stored in the Pool Management Table 102-13-1 (see FIG. 9). If a capacity pool page is allocated from an external volume 111$e$, the program proceeds to step 102-23-2-5. If a capacity pool page is not allocated from an external volume 111$e$, the program proceeds to step 102-23-2-9. In step 102-23-2-5, this program checks the attribution of the volumes by referring to the Pair Management Table 102-14-1. If the volume is a secondary volume, the program proceeds to step 102-23-2-6. If the volume is not a secondary volume, the program proceeds to step 102-23-2-9.

In step 102-23-2-6, this program gets a primary volume paired with this secondary volume and gets other secondary volumes paired with the primary volume by referring to the Pair Management Table 102-14-1. This program finds a capacity volume page for a virtual volume page of other secondary volume in same address with the designated address. Further, this program gets the external volume 111$e$ for which a capacity pool page linked to the virtual volume page of other secondary volume is stored. In step 102-23-2-7, this program checks the attribution of the selected migration target pool volume by referring to the Pair Management Table 102-14-1 (see FIG. 11). If the volume is an external volume and has deduplication function, the program proceeds to step 102-23-2-8. If the volume is not an external volume or does not have deduplication function, the program proceeds to step 102-23-2-9. In step 102-23-2-8, this program allocates an unused capacity pool page to the designated virtual volume page from the selected external volume having deduplication function by referring to the Pool Management Table 102-13-1. In step 102-23-1-9, this program allocates an unused capacity pool page to the designated virtual volume page from an adequate pool volume in the designated tier by referring to the Pool Management Table 102-13-1. In step 102-23-2-10, this program migrates data from current to newly selected capacity pool page and changes the link between the virtual volume page and the capacity pool page. Then, the program returns to step 102-23-2-2.

Figure 14:
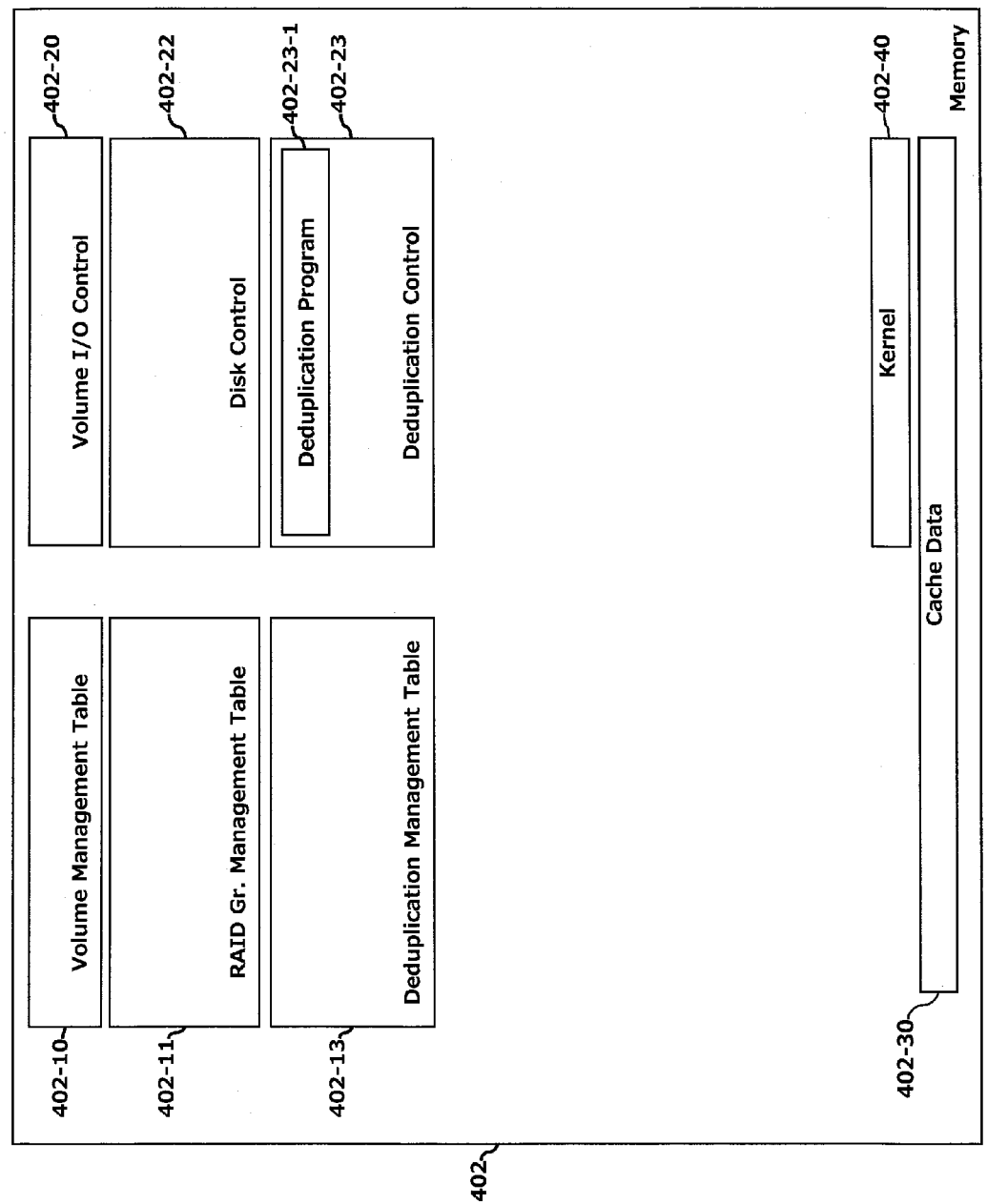
FIG. 14 illustrates an example of the configuration of tables and programs in the memory of the deduplication storage device according to the first embodiment.

FIG. 14 illustrates an example of the configuration of tables and programs in the memory 402 of the deduplication storage device 400 according to the first embodiment. The memory 402 includes a Volume Management Table 402-10, a RAID Group Management Table 402-11, a Deduplication Management Table 402-13, a Volume I/O Control 402-20, a Disk Control 402-22, and a Deduplication Control 402-23. The Volume Management Table 402-10 manages the configuration of a volume 400. This technology is generally known and is not described in detail here. The RAID Group Management Table 402-11 manages the configuration of a RAID group 411 having disks 406. This technology is generally known and is not described in detail here. The Deduplication Management Table 402-13 manages relations of the deduplication volume pages 410-1 and deduplication pool pages 411-1 (see FIG. 15). The Volume I/O Control 402-20 controls read and write I/O to a volume 410. This technology is generally known and is not described in detail here. The Disk Control 402-22 controls read and write I/O to the disks 406 and redundancy (mirroring and parity calculation) control. This technology is generally known and is not described in detail here. The Deduplication Control 402-23 finds the same data and deduplicates (see FIG. 13).

FIG. 15 illustrates an example of the configuration of the Deduplication Management Table 402-13. This table includes the following columns. Deduplication Volume Page Number 402-13-1 represents an ID of the deduplication volume page. Hash Value 402-13-2 represents a hash value of the stored data in this deduplication volume page. MD5 (Message Digest Algorithm 5) or SHA-1 (Secure Hash Algorithm 1) is used to calculate the hash value. Modification Marker 402-13-3 represents a marker. When write I/O occurs into the deduplication volume page, the marker changes to "Yes." When hash value calculation occurs on the deduplication volume page and stores to the Hash Value 402-13-2 cell, the marker changes to "No." Deduplication Pool Page Number 402-13-4 represents a reference to a deduplication pool page which stores the data of the deduplication volume page.

Figure 16:
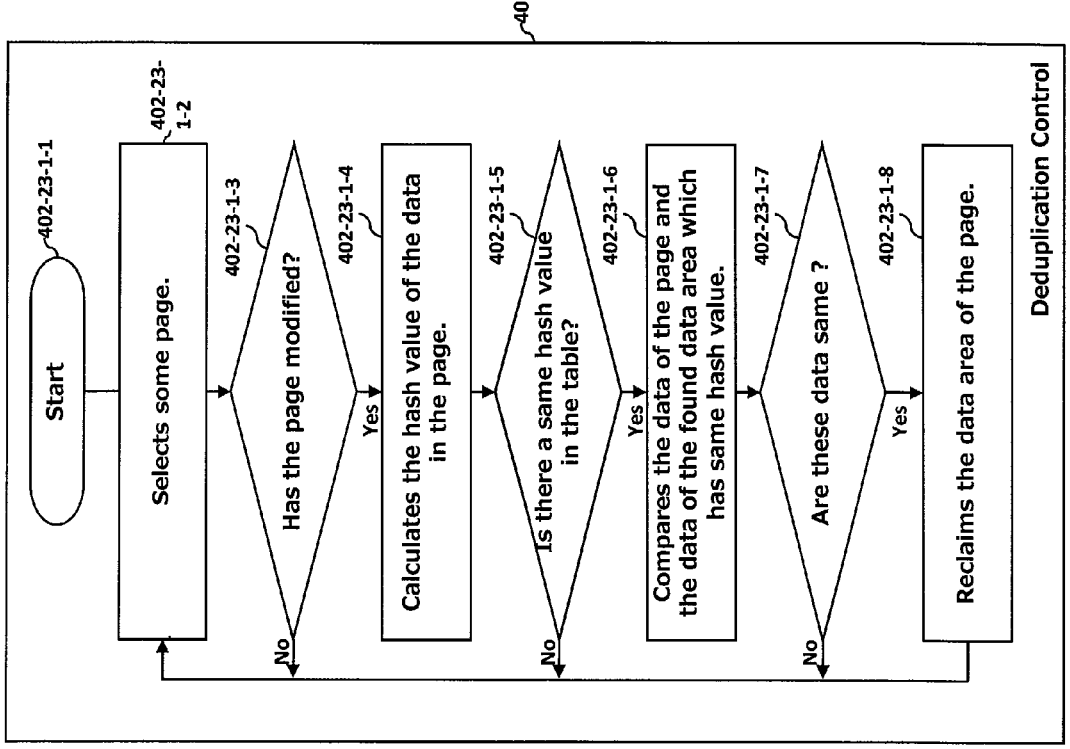
FIG. 16 illustrates an example of a process flow of the Deduplication Program of the deduplication storage device.

FIG. 16 illustrates an example of a process flow of the Deduplication Program 402-23-1 of the deduplication storage device 400. This program is a resident program. This program has a general deduplication scheme. The program starts at step 402-23-1-1. In step 402-23-1-2, this program selects an adequate deduplication volume page. In step 402-23-1-3, this program checks the Modification Marker 402-13-3 cell of the selected deduplication volume page (see FIG. 15). If the value is "Yes," this program proceeds to step 402-23-1-4. If the value is "No", this program returns to step 402-23-1-2. In step 402-23-1-4, this program reads the data in a deduplication pool page linked by the Deduplication Pool Page Number 402-13-4 from the deduplication volume page. Then it calculates the hash value, stores the hash value to the Hash Value 402-13-2 cell, and changes the Modification Marker 402-13-3 cell to "No" (see FIG. 15). In step 402-23-1-5, this program searches for same hash value in the Hash Value cell 402-13-2. If it finds the same hash value, this program proceeds to step 402-23-1-6. If it does not find the same hash value, this program returns to step 402-23-1-2. In step 402-23-1-6, this program compares data in the original and the found deduplication pool page. In step 402-23-1-7, the program checks whether the data are the same. If the data are same, this program proceeds to step 402-23-1-8. If the data are different, this program returns to step 402-23-1-2. In step 402-23-1-8, this program changes the link, and the deduplication volume page becomes to refer to the found deduplication. The program reclaims the original deduplication pool page as free.

Second Embodiment

In the second embodiment, a storage subsystem stores and distributes data to plural deduplication storage devices. The deduplication storage device mounts the storage subsystem to store data. The storage subsystem also has deduplication function (but the page size is larger than the deduplication storage device), so deduplicated data by deduplication storage devices can be deduplicated again by the storage subsystem. To optimize the possibility of deduplication, the deduplication storage derives sort the data with reconciliation.

Figure 17:
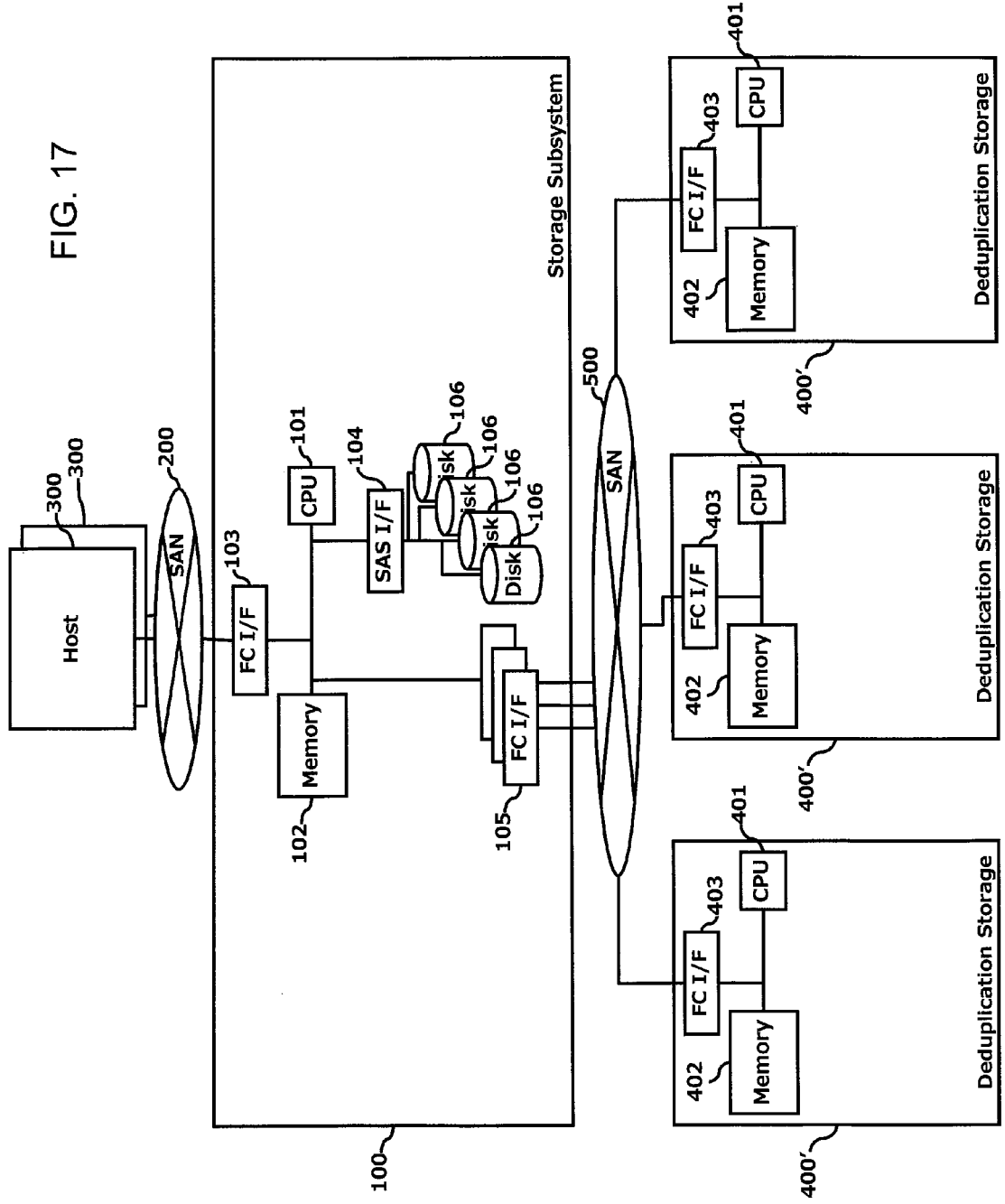
FIG. 17 illustrates an example of a hardware configuration of an information system according to the second embodiment.

FIG. 17 illustrates an example of a hardware configuration of an information system according to the second embodiment. Only changes from the first embodiment of FIG. 1 will be discussed. In FIG. 17, the deduplication storage device 400' does not have disk 406 and disk interface 405.

Figure 18:
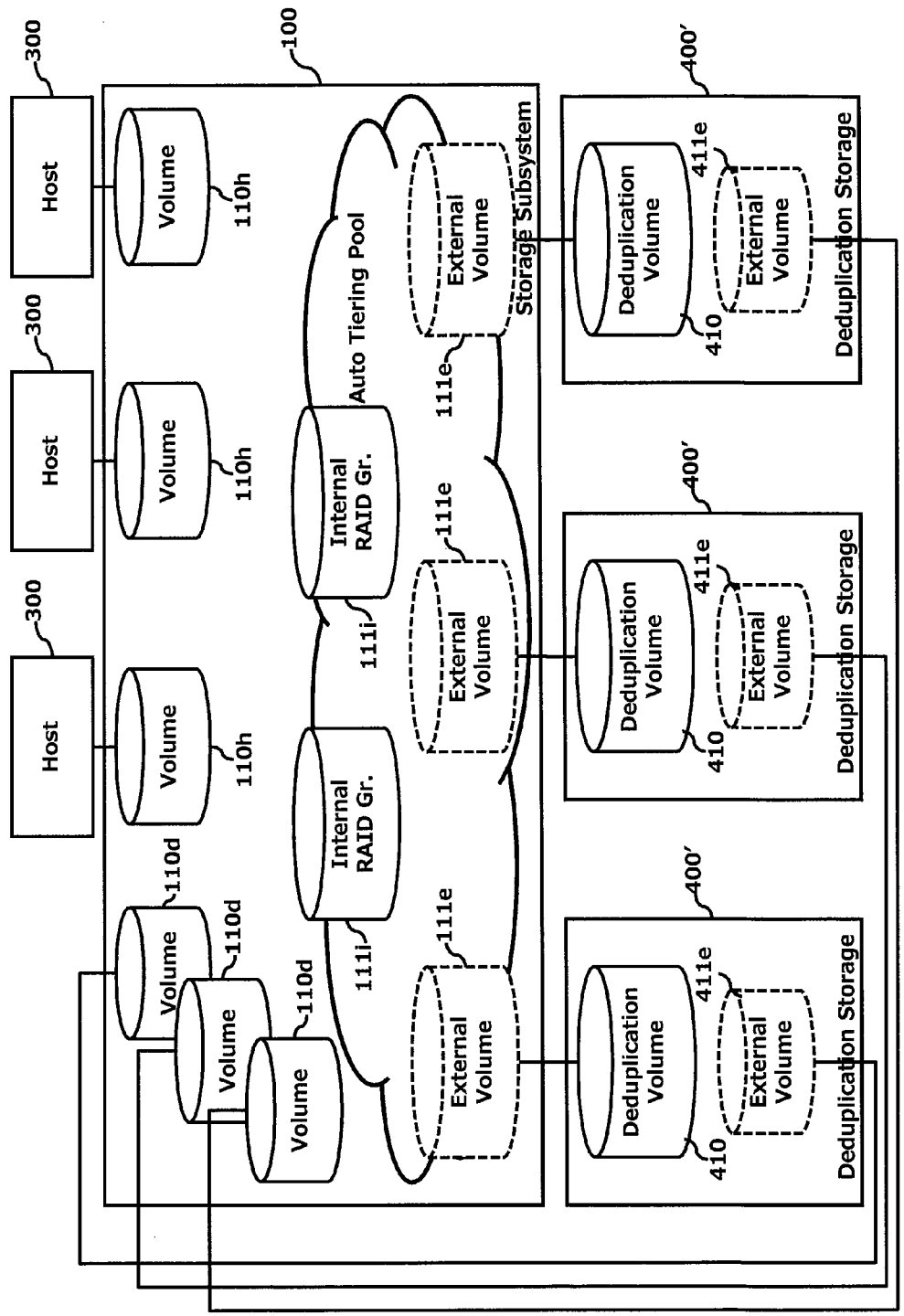
FIG. 18 illustrates an example of a logical configuration of the invention applied to the architecture of FIG. 17 according to the second embodiment.

FIG. 18 illustrates an example of a logical configuration of the invention applied to the architecture of FIG. 17 according to the second embodiment. Only changes from the first embodiment of FIG. 2 will be discussed. The storage subsystem 100 provides a volume 110d to be mount by a deduplication storage device 400'. The storage subsystem 100 provides a volume 110h to be mounted by a host computer 300. Collectively, volumes 110d and 110h are called volumes 110. The deduplication storage device 400' provides a deduplication pool 411 to store data written into a volume 410. The deduplication pool 411 is not a RAID group consisting of disks 106. The deduplication pool 411 mounts volume 110d.

Figure 19:
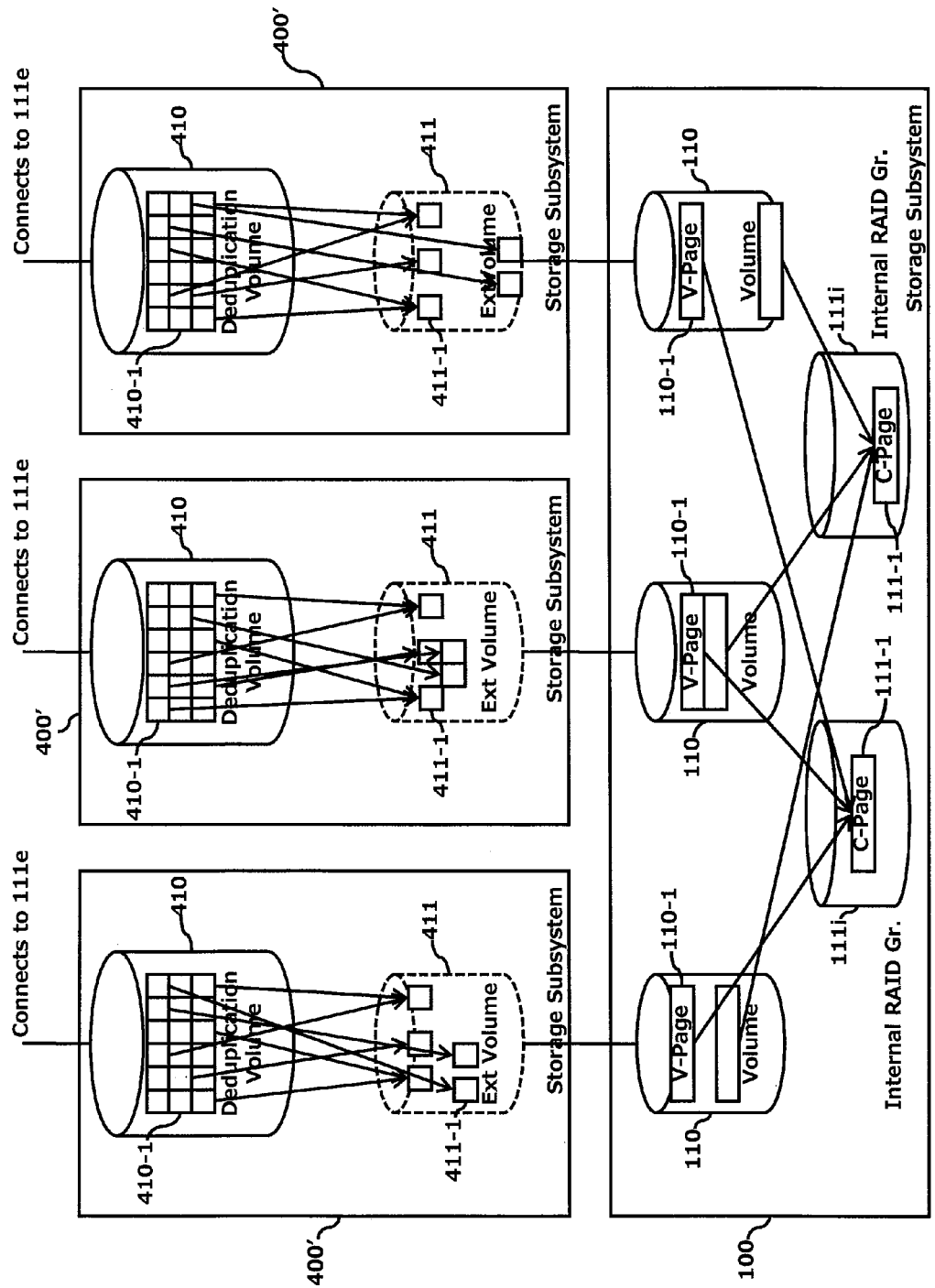
FIG. 19 illustrates an example of logical configuration of a deduplication storage device according to the second embodiment.

FIG. 19 illustrates an example of logical configuration of a deduplication storage device 400 according to the second embodiment. Only changes from the first embodiment of FIG. 4 will be discussed. The deduplication storage provides a deduplication pool 411 to store data written into a volume 410. The deduplication pool 411 is not a RAID group consisting of disks 106. The deduplication pool 411 mounts volume 110d. A volume 110 is split into plural virtual volume pages 110-1. An internal RAID group 111i is split into plural capacity pool pages 111-1. Two or more aforesaid virtual volume page 110-1 can refer to one same capacity pool page 111-1.

Figure 20:
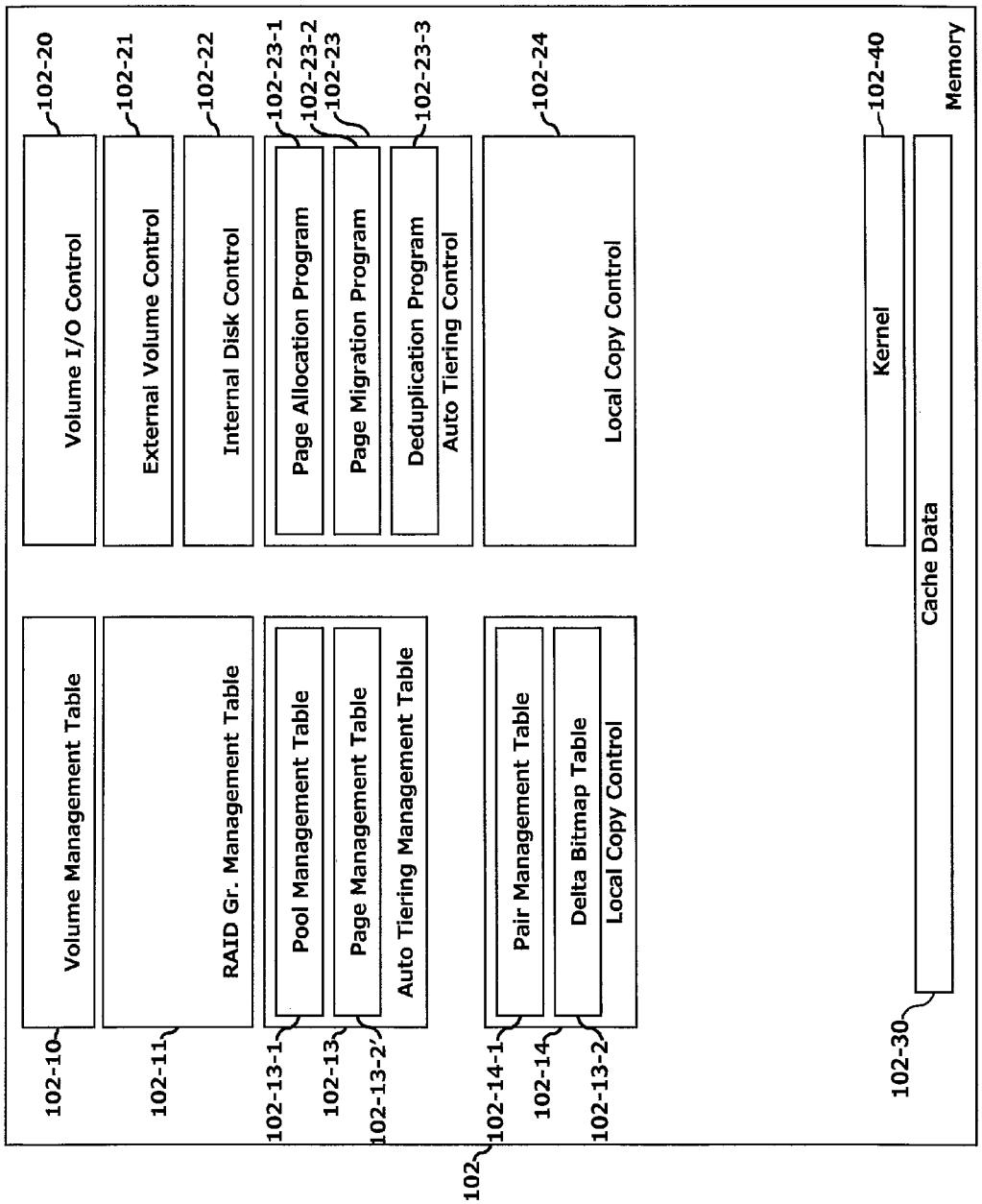
FIG. 20 illustrates an example of the configuration of tables and programs in the memory of the storage subsystem of FIG. 17 according to the second embodiment.

FIG. 20 illustrates an example of the configuration of tables and programs in the memory 102 of the storage subsystem 100 of FIG. 17 according to the second embodiment. Only changes from the first embodiment of FIG. 6 will be discussed. The Auto Tiering Management Table 102-13 of FIG. 20 newly includes a Page Management Table 102-13-2' instead of a Page Management Table 102-13-2 in FIG. 6. The Page Management Table 102-13-2' manages relations of the virtual volume pages 110-1, capacity pool pages 111-1, and deduplication (see FIG. 21). The Auto Tiering Control 102-23 includes a Deduplication Program 102-23-3 that finds the same data capacity pool pages and deduplicates them (see FIG. 22).

FIG. 21 illustrates an example of configuration of the Pool Management Table 102-13-2' according to the second embodiment. Only changes from the first embodiment of FIG. 10 will be discussed. This table newly includes the following columns. Hash Value 102-13-2-7 represents a hash value of the stored data in this deduplication volume page. MD5 (Message Digest Algorithm 5) or SHA-1 (Secure Hash Algorithm 1) is used to calculate the hash value. Modification Marker 102-13-2-6 represents a marker. When write I/O occurs into the deduplication volume page, the marker changes to "Yes." When hash value calculation occurs on the deduplication volume page and stores to the Hash Value 102-13-2-7 cell, the marker changes to "No."

Figure 22:
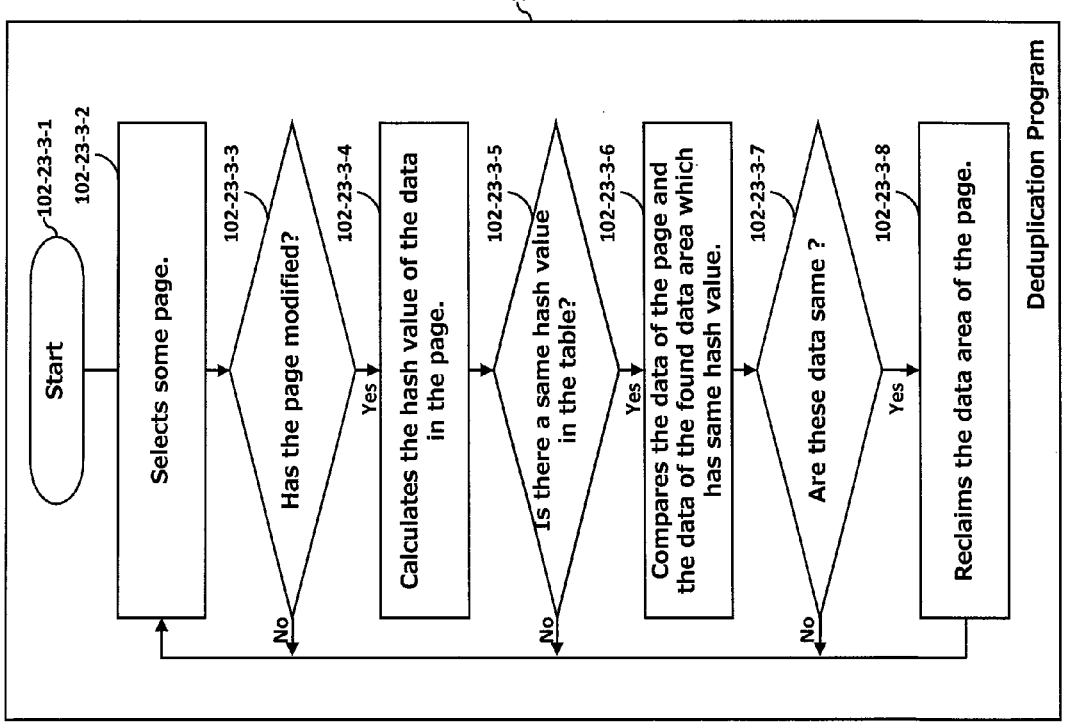
FIG. 22 illustrates an example of a process flow of the Deduplication Program of the storage subsystem according to the second embodiment.

FIG. 22 illustrates an example of a process flow of the Deduplication Program 102-23-3 of the storage subsystem 100 according to the second embodiment. This program is resident program. This program has a general deduplication scheme. The program starts at step 102-23-3-1. In step 102-23-3-2, this program selects an adequate virtual volume page. In step 102-23-3-3, this program checks the Modification Marker 102-13-2-6 cell of the selected virtual volume page. If the value is "Yes," this program proceeds to step 102-23-3-4. If the value is "No," this program returns to step 102-23-3-2. In step 102-23-3-4, this program reads the data in a capacity pool page linked by Virtual Volume Page Number 102-13-2-2 from the virtual volume page. Then it calculates the hash value, stores the hash value to the Hash Value 102-13-2-7 cell, and changes the Modification Marker 402-13-2-6 cell to "No." In step 102-23-3-5, this program searches for the same hash value in Hash Value 102-13-2-7. If it finds the same hash value, this program proceeds to step 102-23-3-6. If it does not find the same hash value, this program returns to step 102-23-3-2. In step 102-23-3-6, this program compares data in the original and the found capacity pool page. In step 102-23-3-7, the program determines whether the data are the same. If the data are the same, this program proceeds to step 102-23-3-8.

If the data are different, this program returns to step 102-23-2. In step 102-23-3-8, this program changes the link, and the virtual volume page becomes to refer to the found capacity pool page. The program reclaims the original capacity pool page as free.

Figure 23:
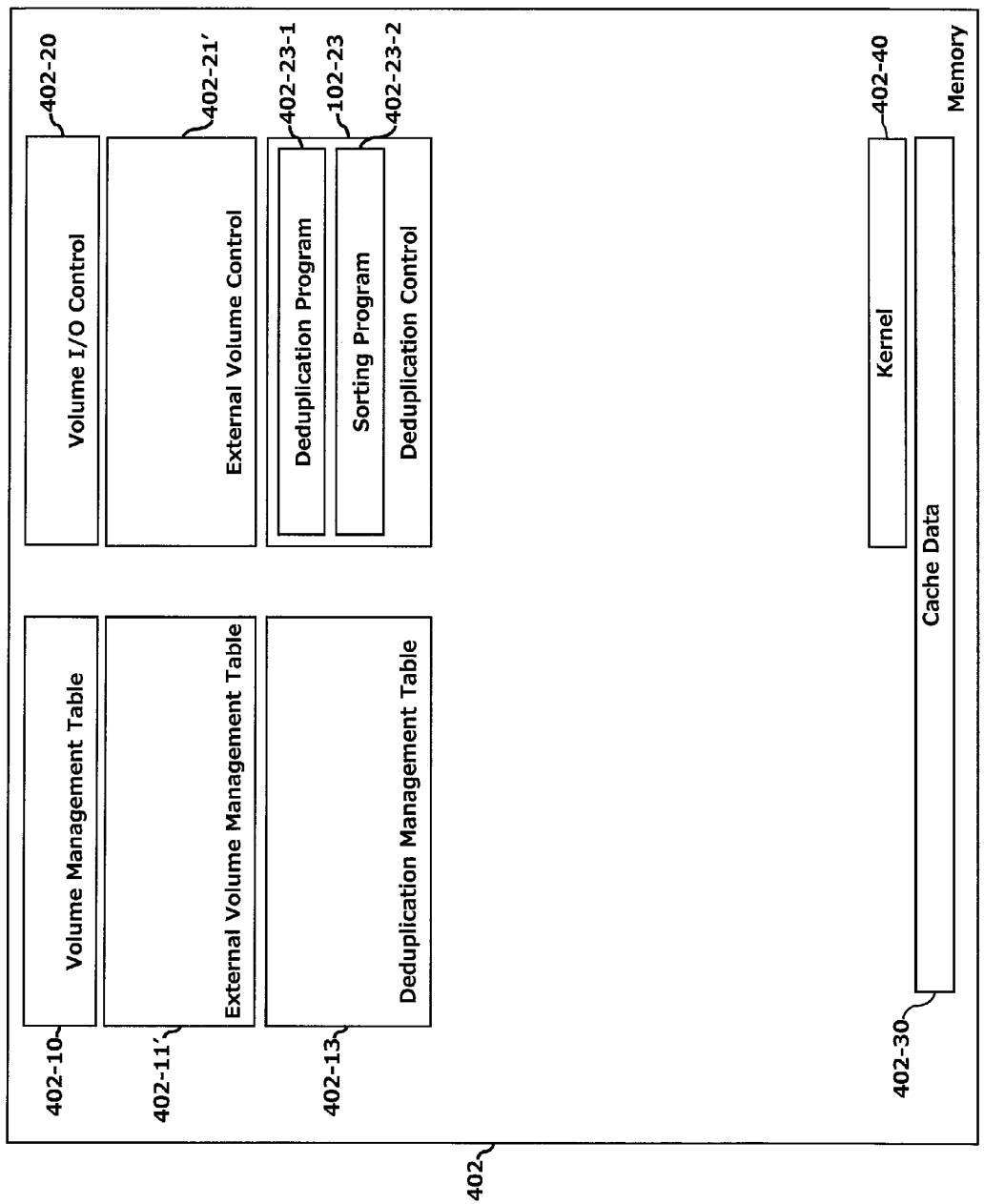
FIG. 23 illustrates an example of configuration of tables and programs in memory of the deduplication storage device according to the second embodiment.

FIG. 23 illustrates an example of configuration of tables and programs in memory 402 of the deduplication storage device 400' according to the second embodiment. Only changes from the first embodiment of FIG. 14 will be discussed. The Deduplication Control 402-23 newly includes a Sorting Program 402-23-2, which sorts data in the deduplication pool 411.

Figure 24:
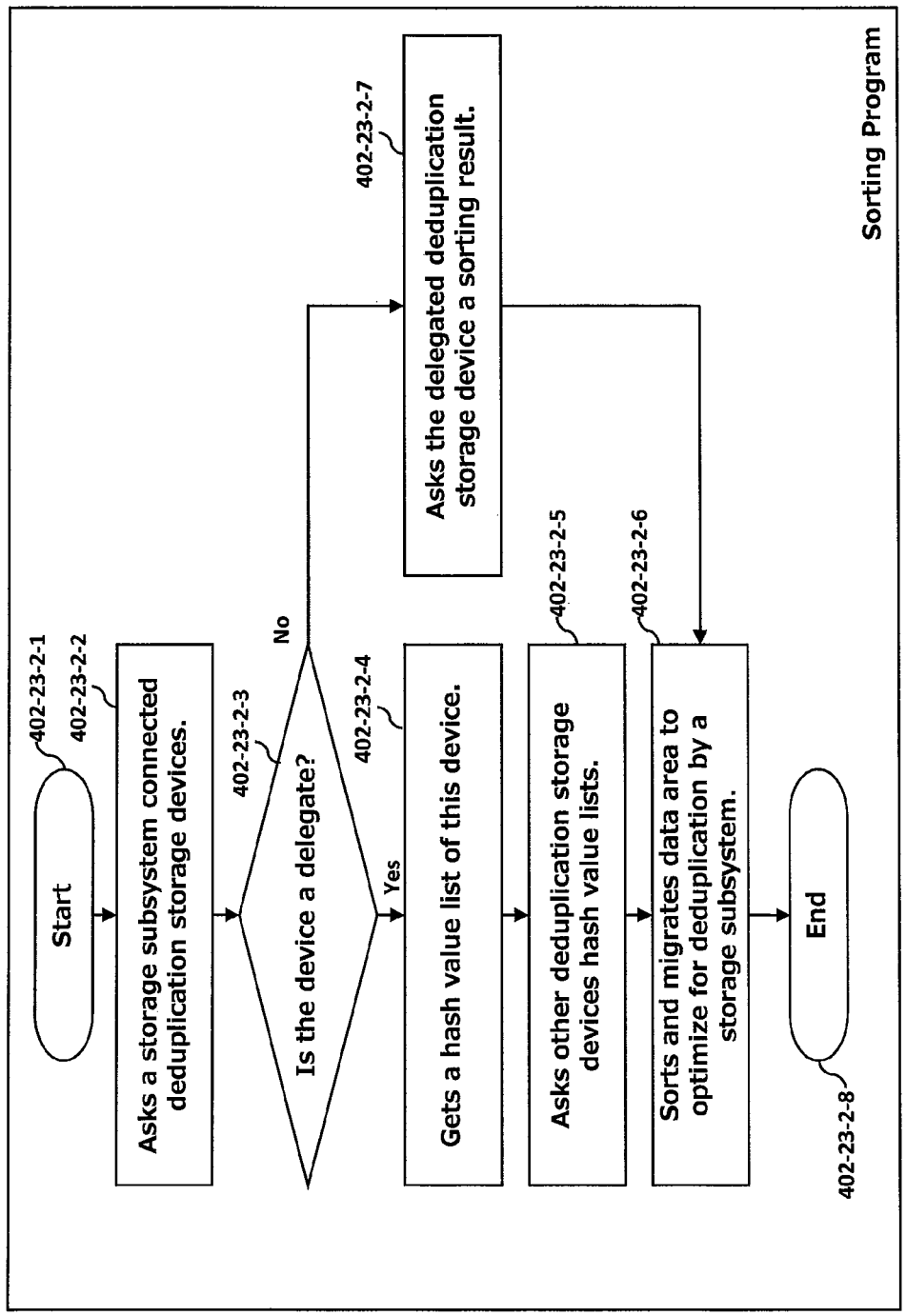
FIG. 24 illustrates an example of a process flow of the Sorting Program of the deduplication storage device according to the second embodiment.

FIG. 24 illustrates an example of a process flow of the Sorting Program 402-23-2 of the deduplication storage device 400' according to the second embodiment. The program starts at step 402-23-2-1. In step 402-23-2-2, this program asks a storage subsystem 100 for information of other connected deduplication storage devices 400 and a delegate deduplication storage device 400. The deduplication storage devices 400 represent a plurality of nodes. The delegate deduplication storage device, as a first node, is a meta data server which includes meta data and locations of files stored in the plurality of nodes.

In step 402-23-2-3, this program checks whether this deduplication storage device 400 is a delegate or is not a delegate. If the deduplication storage device is a delegate, this program proceeds to step 402-2-4. If the deduplication storage device is not a delegate, this program proceeds to step 402-2-7. In step 402-23-2-4, this program reads the Hash Value 402-13-2 from the deduplication management table 402-13. In step 402-23-2-5, this program asks for Hash Values 402-13-2 of other deduplication storage devices 400 which connect to the same storage subsystem 100. In step 402-23-2-6, this program sorts the hash values. If some deduplication storage devices have data having the same hash value, this program instructs this deduplication storage device 400 and other deduplication storage devices 400 to migrate and sort the deduplication pool pages which have that hash value to the same virtual volume page 110-1. For example, a first deduplication storage has data which has hash value 0xbb, 0xaa, 0xcc, 0xdd and 0xee. A second deduplication storage has data which has hash value 0xaa, 0xbb, 0xdd, 0xab and 0xff. The first and second storage devices migrate and sort data 0xaa, 0xbb and 0xdd to an area which is located on a virtual volume page 110-1, and fill with 0 data to empty area on the virtual volume page. In this way, the virtual volume page which has data 0xaa, 0xbb, 0xdd is stored into external volumes 111e connecting to the first and second deduplication storage devices. The virtual volume pages in the external volumes 111e may have the same data, so that the virtual volume pages are deduplicated. In step 402-23-2-7, this program asks the delegate deduplication storage device to obtain result of the sorting. In step 402-23-2-8, this program ends.

Third Embodiment

In the third embodiment, a backup server knows characteristics of objects (e.g., object type and backup generation) and address of the objects. The backup server provides the information to the storage subsystem. The storage subsystem stores the page data with the received information into the deduplication storage devices.

Figure 25:
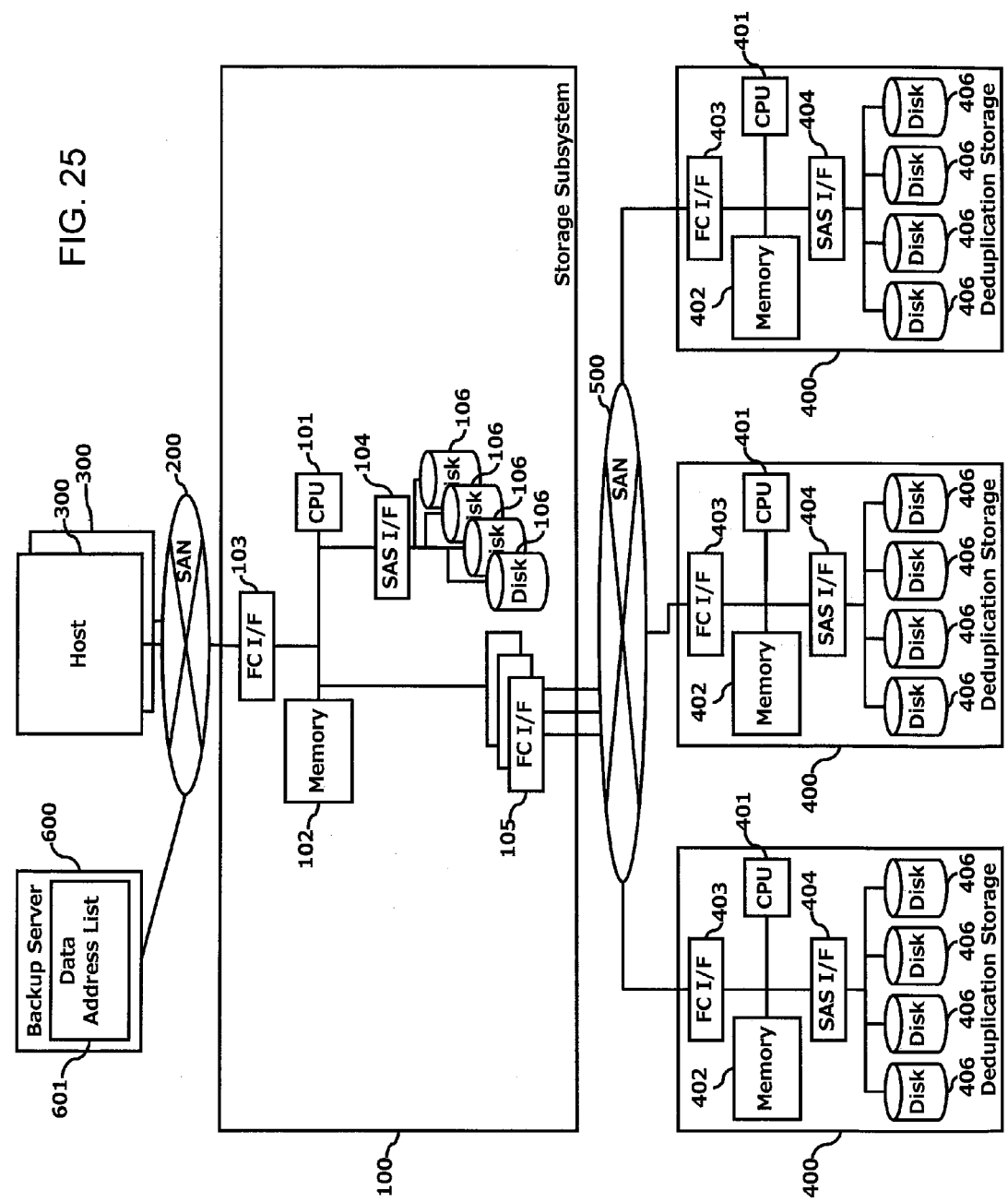
FIG. 25 illustrates an example of a hardware configuration of an information system according to the third embodiment.

FIG. 25 illustrates an example of a hardware configuration of an information system according to the third embodiment. Only changes from the first embodiment of FIG. 1 will be discussed. A backup server 600 connects to the storage subsystem 100 via the network 200. The backup server 600 has a Data Address List 601 (see FIG. 26).

FIG. 26 illustrates an example of the configuration of the Data Address List 601 of the backup server 600 according to the third embodiment. This table includes the following columns. An Object Number 601-1 represents ID of an object. Object Index 601-2 represents ID of classification of the object. For example, two objects are backup of the same object. The two objects have the same value in the Object Index cell 601-2. Volume Number 601-3 represents a volume in which the object is stored. Top Address 601-4 represents a top address of the objects stored. Size 601-5 represents a size of the object.

Figure 27:
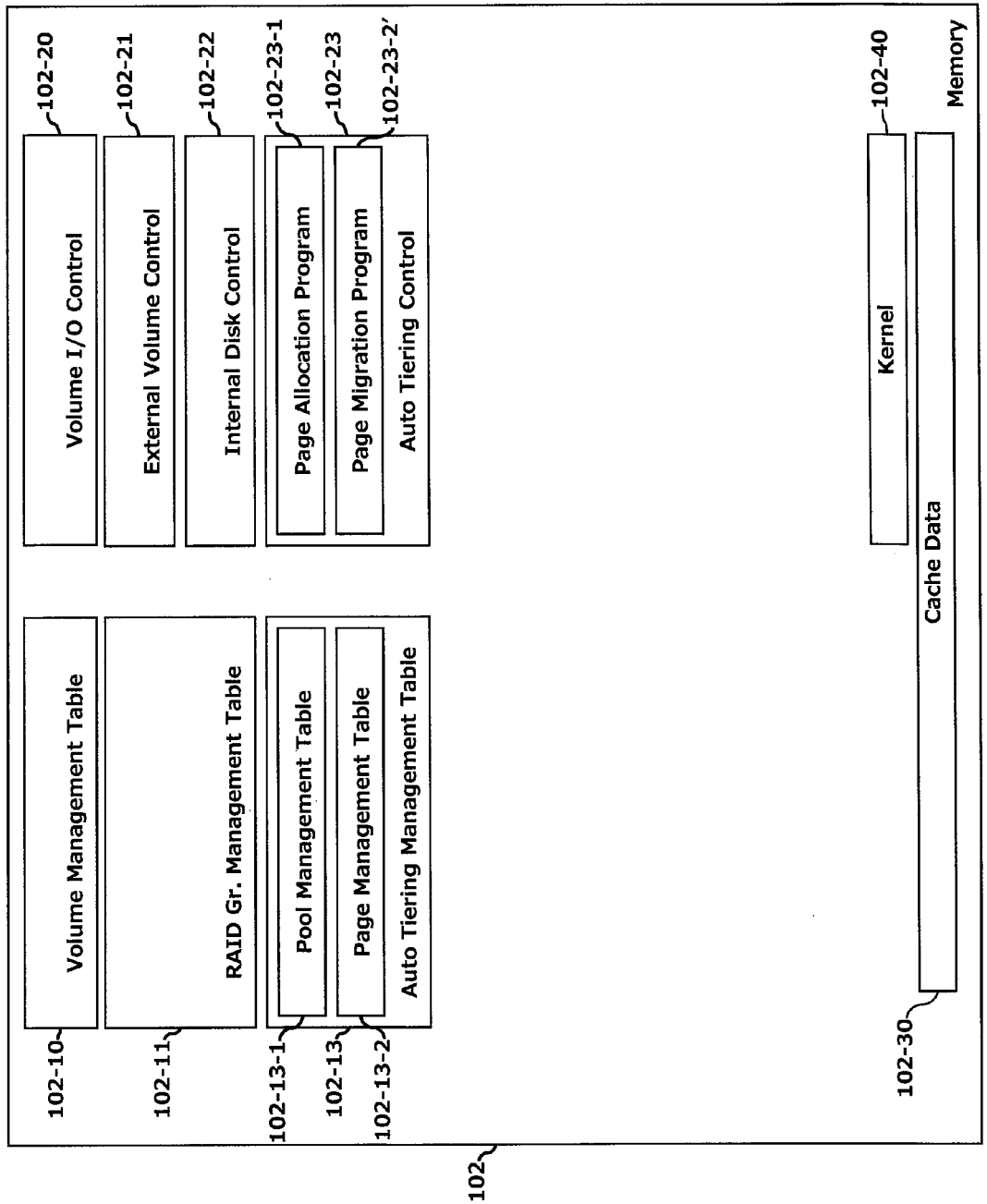
FIG. 27 illustrates an example of the configuration of tables and programs in the memory of the deduplication storage device according to the third embodiment.

FIG. 27 illustrates an example of the configuration of tables and programs in the memory 402 of the deduplication storage device 400 according to the third embodiment. Only changes from the first embodiment of FIG. 6 will be discussed. The Local Copy Management Table 102-14 of FIG. 6 does not exist in FIG. 27. The Auto Tiering Control 102-23 newly includes a Page Migration Program 102-23-2' instead of a Page Migration Program 102-23-2. The Page Migration Program 102-23-2' migrates data and allocation between two capacity pool pages 111-1 based on the object classification and alignment provided by backup server 600 (see FIG. 28). The Local Copy Control 102-24 of FIG. 6 does not exist in FIG. 27.

Figure 28:
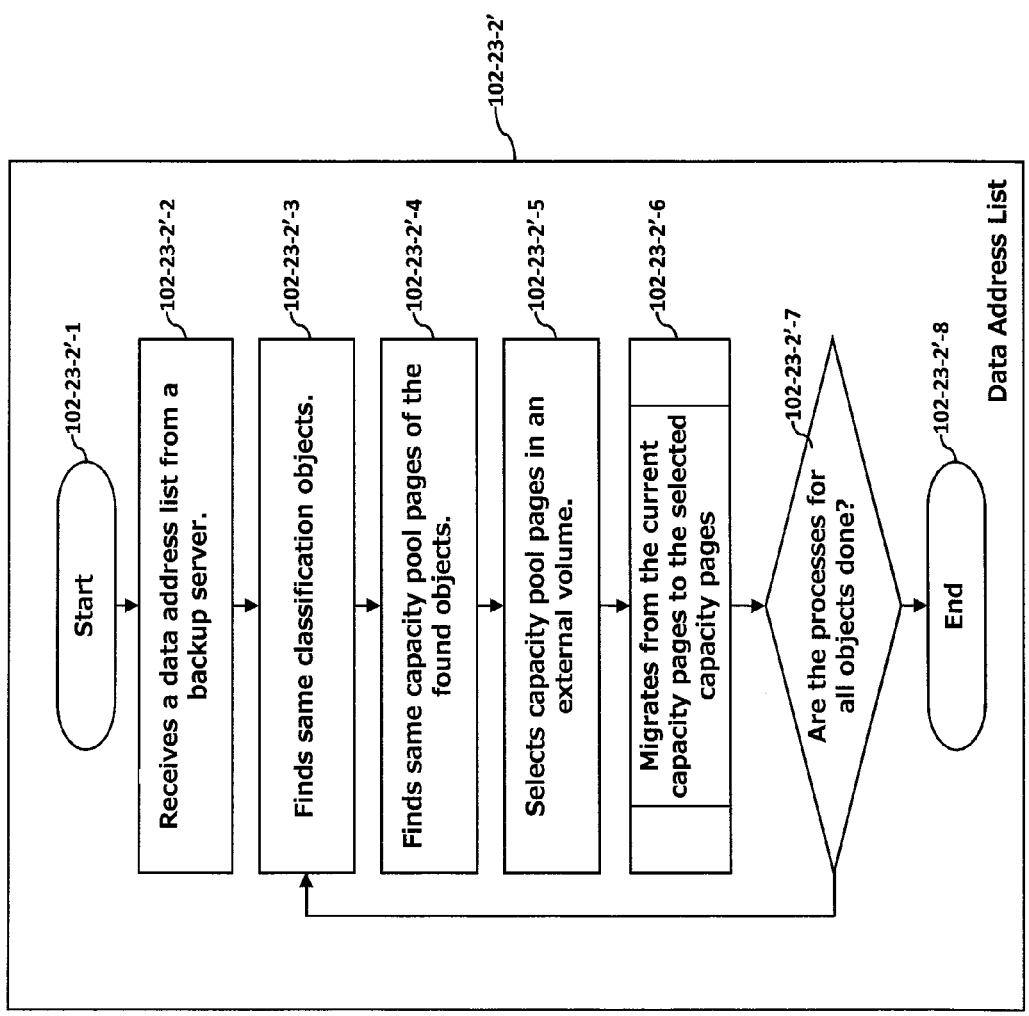
FIG. 28 illustrates an example of a process flow of the Page Migration Program according to the third embodiment.

FIG. 28 illustrates an example of a process flow of the Page Migration Program 102-23-2' according to the third embodiment. The program starts at step 102-23-2'-1. In step 102-23-2'-2, this program receives a data address list 601 from the backup server 600. In step 102-23-2'-3, this program finds the same classification objects. In step 102-23-2'-4, this program finds capacity pool pages storing similar offset of a data of the found same classification objects. In step 102-23-2'-5, this program selects an external volume 111e and the capacity pool pages in the external volume 111e which connects to a deduplication storage device 400. In step 102-23-2'-6, this program migrates the found capacity pool pages to the selected capacity pool pages of the selected external volume 111e. In step 102-23-2'-7, this program repeats step 102-23-2'-3 to step 102-23-2'-5 until all objects are migrated. In step 102-23-2'-8, this program ends.

Of course, the system configurations illustrated in FIGS. 1, 17, and 25 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for a distribution design for fast RAID rebuild architecture. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage subsystem coupled to a plurality of external storage subsystems each of which executes data deduplication, the storage subsystem comprising:
    a storage controller including a processor and a memory;
    a primary volume; and
    a plurality of secondary volumes corresponding to the primary volume;
    wherein the storage controller controls to allocate a storage region provided by a first external storage subsystem to a first address of a first secondary volume, and another storage region provided by the first external storage subsystem to the first address of a second secondary volume.

2. The storage subsystem according to claim 1,
    wherein the storage controller controls to allocate a storage region provided by a second external storage subsystem to a second address of a second secondary volume, and another storage region provided by the second external storage subsystem to the second address of a second secondary volume.

3. The storage subsystem according to claim 2,
    wherein the storage controller controls to allocate a storage region provided by a third external storage subsystem to a third address of the first secondary volume, and another storage region provided by the third external storage subsystem to the third address of the second secondary volume.

4. The storage subsystem according to claim 1,
    wherein the secondary volume stores a snapshot of the primary volume.

5. The storage subsystem according to claim 1,
    wherein the secondary volume establishes copy pair with the primary volume.

6. A system comprising:
    a storage subsystem which includes a storage controller having a processor and a memory, a primary volume, and a plurality of secondary volumes corresponding to the primary volume; and
    a plurality of external storage subsystems each of which executes data deduplication, the plurality of external storage subsystems being coupled to the storage subsystem;
    wherein the storage controller controls to allocate a storage region provided by a first external storage subsystem to a first address of a first secondary volume, and another storage region provided by the first external storage subsystem to the first address of a second secondary volume.

7. The system according to claim 6,
    wherein the storage controller controls to allocate a storage region provided by a second external storage subsystem to a second address of a second secondary volume, and another storage region provided by the second external storage subsystem to the second address of a second secondary volume.

8. The system according to claim 7,
    wherein the storage controller controls to allocate a storage region provided by a third external storage subsystem to a third address of the first secondary volume, and another storage region provided by the third external storage subsystem to the third address of the second secondary volume.

9. The system according to claim 6,
    wherein the secondary volume stores a snapshot of the primary volume.

10. The system according to claim 6,
    wherein the secondary volume establishes copy pair with the primary volume.

* * * * *